US010393882B2

(12) United States Patent
Dai et al.

(10) Patent No.: US 10,393,882 B2
(45) Date of Patent: Aug. 27, 2019

(54) ESTIMATION OF INTER-FREQUENCY BIAS FOR AMBIGUITY RESOLUTION IN GLOBAL NAVIGATION SATELLITE SYSTEM RECEIVERS

(71) Applicant: Deere & Company, Moline, IL (US)

(72) Inventors: Liwen L. Dai, Torrance, CA (US); Yujie Zhang, Torrance, CA (US)

(73) Assignee: Deere & Company, Moline, IL (US)

( * ) Notice: Subject to any disclaimer, the term of this patent is extended or adjusted under 35 U.S.C. 154(b) by 306 days.

(21) Appl. No.: 15/276,387

(22) Filed: Sep. 26, 2016

(65) Prior Publication Data

US 2017/0269227 A1 Sep. 21, 2017

Related U.S. Application Data

(60) Provisional application No. 62/310,301, filed on Mar. 18, 2016.

(51) Int. Cl.
*G01S 19/44* (2010.01)
*G01S 19/29* (2010.01)
(Continued)

(52) U.S. Cl.
CPC .............. *G01S 19/44* (2013.01); *G01S 19/29* (2013.01); *G01S 19/30* (2013.01)

(58) Field of Classification Search
CPC ........... G01S 19/44; G01S 19/29; G01S 19/30
See application file for complete search history.

(56) References Cited

U.S. PATENT DOCUMENTS 5,359,332 A * 10/1994 Allison ................... G01S 19/04 342/357.42
5,412,388 A * 5/1995 Attwood ................... G01S 5/02 342/357.21

(Continued)

FOREIGN PATENT DOCUMENTS

EP 2759849 A1 7/2014
WO 2008150390 12/2008

OTHER PUBLICATIONS

Chassagne, Olivier. “The Future of Satellite Navigation, One-Centimeter Accuracy with PPP”, GNSS Forum, pp. 51-54, Mar.-Apr. 2012 [online] [retrieved on Aug. 31, 2016]. Retrieved from the Internet: <URL:http://www.insidegnss.com/auto/marapr12-Chassagne.pdf> (6 pages).

(Continued)

*Primary Examiner* — Bernarr E Gregory
(74) *Attorney, Agent, or Firm* — Hanley, Flight & Zimmerman, LLC

(57) ABSTRACT

Example methods disclosed herein include accessing carrier phase measurements and code measurements obtained for a plurality of satellite signals of a global navigation satellite system. Disclosed example methods also include determining an initial set of floating-point ambiguities based on the measurements, the initial set of floating-point ambiguities including inter-frequency bias (IFB). Disclosed example methods further include performing a least squares search process based on the initial set of floating-point ambiguities to determine a set of integer ambiguities and an estimate of the IFB. In some examples, an additional (e.g., wide-lane) filter is used to realize a combination of carrier phase and code IFB. In some examples, IFB estimation is further realized by determining a median of IFB estimates over a window time. In some examples, the resulting IFB estimate (Continued)

and the set of integer ambiguities are used to estimate a position of a receiver, determine a satellite correction signal, etc.

20 Claims, 8 Drawing Sheets

(51) Int. Cl.
*G01S 19/30* (2010.01)
*G01S 19/00* (2010.01)

(56) References Cited

U.S. PATENT DOCUMENTS

| | | | | |
|---|---|---|---|---|
| 5,412,389 | A * | 5/1995 | Olds | G01S 5/02 342/357.21 |
| 5,757,646 | A | 5/1998 | Talbot et al. | |
| 5,825,326 | A * | 10/1998 | Semler | G01S 19/44 342/357.27 |
| 6,408,178 | B1 * | 6/2002 | Wickstrom | G01S 19/42 342/352 |
| 7,119,741 | B2 | 10/2006 | Sharpe et al. | |
| 7,589,668 | B2 * | 9/2009 | Vollath et al. | G01S 19/44 342/357.04 |
| 7,961,143 | B2 | 6/2011 | Dai et al. | |
| 8,170,844 | B2 * | 5/2012 | Buchler | G01S 19/44 702/181 |
| 8,368,590 | B2 | 2/2013 | Vollath et al. | |
| 8,368,591 | B2 | 2/2013 | Talbot et al. | |
| 8,451,168 | B2 * | 5/2013 | Henkel | G01S 19/44 342/357.44 |
| 8,542,146 | B2 | 9/2013 | Vollath | |
| 9,057,780 | B2 | 6/2015 | Bar-Sever et al. | |
| 9,128,176 | B2 | 9/2015 | Seeger | |
| 9,146,319 | B2 | 9/2015 | Leandro | |
| 9,658,341 | B2 * | 5/2017 | Mathews | G01S 19/11 |
| 2007/0120733 | A1 * | 5/2007 | Vollath | G01S 19/44 342/357.27 |
| 2008/0074319 | A1 | 3/2008 | Han et al. | |
| 2008/0297408 | A1 * | 12/2008 | Dai | G01S 19/55 342/357.38 |
| 2009/0184869 | A1 | 7/2009 | Talbot et al. | |
| 2010/0188285 | A1 * | 7/2010 | Collins | G01S 19/44 342/357.31 |
| 2011/0140959 | A1 * | 6/2011 | Vollath | G01S 19/44 342/357.27 |
| 2011/0148698 | A1 | 6/2011 | Vollath | |
| 2011/0181462 | A1 * | 7/2011 | Lawrence | G01S 19/44 342/357.26 |
| 2011/0210889 | A1 * | 9/2011 | Dai | G01S 19/44 342/357.29 |
| 2012/0176271 | A1 | 7/2012 | Dai et al. | |
| 2013/0120187 | A1 | 5/2013 | Dai et al. | |

OTHER PUBLICATIONS

Choy, Suelynn."GNSS Precise Point Positioning: A Fad or the Future of Satellite Navigation and Positioning?" Lecture slides [online].School of Mathematical and Geospatial Sciences Royal Melbourne Institute of Technology University, Australia, 2014 [retrieved on Aug. 31, 2016]. Retrieved from the Internet: <URL:http://www.fig.net/resources/proceedings/fig_proceedings/fig2014/ppt/TS05A/Choy.pdf> (9 pages).

Murfin, Tony. "Hexagon's Acquisition of Veripos: Why Did This Go Down?" GPS World [online], Apr. 16, 2014 [retrieved on Aug. 31, 2016]. Retrieved from the Internet: <URL:http://gpsworld.com/hexagons-acquisition-of-veripos-why-did-this-go-down/> (12 pages).

Murfin, Tony. "Look, No Base-Station!—Precise Point Positioning (PPP)." GPS World [online], Mar. 20, 2013 [retrieved Aug. 31, 2016]. Retrieved from the Internet: <URL:http://gpsworld.com/look-no-base-station-precise-point-positioning-ppp/> (11 pages).

Laurichesse, Denis. "Innovation: Carrier-Phase Ambiguity Resolution, Handling the Biases for Improved Triple-Frequency PPP Convergence." GPS World, Apr. 3, 2015 [online], [retrieved Aug. 31, 2016]. Retrieved from the Internet: <URL:http://gpsworld.com/innovation-carrier-phase-ambiguity-resolution/> (22 pages).

Dixon, Kevin. "StarFire: A Global SBAS for Sub-Decimeter Precise Point Positioning." NavCom Technology Inc., ION GNSS 19th International Technical Meeting of the Satellite Division [online], Sep. 26-29, 2006 [retrieved on Aug. 31, 2016]. Retrieved from the Internet: <URL:http://www.gdgps.net/system-desc/papers/starfire.pdf> (11 pages).

Shi, Junbo and Gao, Yang. "A Comparison of Three PPP Integer Ambiguity Resolution Methods." GPS Solutions 18.4 [online], 2013, pp. 519-528 [retrieved on Aug. 31, 2016]. Retrieved from the Internet: <URL:http://link.springer.com/article/10.1007/s10291-013-0348-2> (10 pages).

Leandro, R., et al. "RTX Positioning: The Next Generation of cm-accurate Real-Time GNSS Positioning." Trimble Terrasat GmbH [online brochure], Sep. 2012 [retrieved on Aug. 31, 2016]. Retrieved from the Internet: <URL:https://www.trimble.com/positioning-services/pdf/WhitePaper_RTX.pdf> (16 pages).

Goode, Matthew. "New Developments in Precise Offshore Positioning." Ocean Business / Offshore Survey [online presentation],Apr. 15-16, 2015, Southampton, United Kingdom [retrieved on Aug. 31, 2016]. Retrieved from the Internet: <URL:http://www.oceanbusiness.com/wp-content/uploads/2015/04/1410_MatthewGoode.pdf> (31 pages).

Ott, Lee. "Use of Four GNSS Systems in Operational Precise Point Positioning Service." Furgo Satellite Positioning [online presentation], 2015 [retrieved on Aug. 31, 2016]. Retrieved from the Internet: <URL:http://www.gps.gov/cgsic/meetings/2015/ott.pdf> (24 pages).

Toor, Pieter. "Munich Satellite Navigation Summit 2014." Veripos, Ltd. [online presentation], Mar. 26, 2014 [retrieved on Aug. 31, 2016]. Retrieved from the Internet: <URL:URL:http://www.terrastar.net/files/docs/Munich_Summit_2014_-_PPP_Session_-_Pieter_Toor_-_VERIPOS.pdf> (7 pages).

Jokinen, Altti Samuli. "Enhanced Ambiguity Resolution and Integrity Monitoring Methods for Precise Point Positioning." Centre for Transport Studies, Department of Civil and Environmental Engineering, Imperial College London [online thesis], Aug. 2014 [retrieved on Aug. 31, 2016]. Retrieved from the Internet: <URL:https://spiral.imperial.ac.uk/bitstream/10044/1/24806/1/Jokinen-A-2014-PhD-Thesis.pdf> (268 pages).

"Real-time Service." International GNSS Service [online article], 2015 [retrieved on Aug. 31, 2016]. Retrieved from the Internet: <URL:http://www.igs.org/rts> (1 page).

"Introducing the IGS Real-Time Service (RTS)." International GNSS Service [online], 2015 [retrieved on Aug. 31, 2016]. Retrieved from the Internet <URL:ftp://igs.org/pub/resource/pubs/IGS_Real_Time_Service-131031.pdf> (2 pages).

Duman, Angie, et al. "PPP: IGS Announces the Launch of RTS-IGS." xyHt [online], Apr. 20, 2015 [retrieved on Aug. 31, 2016]. Retrieved from the Internet: <URL:http://www.xyht.com/professional-surveyor-archives/ppp-igs-announces-the-launch-of-rts-igs/> (8 pages).

Laurichesse, D.; Mercier, F.; and Berthias, J. P. "Real-time PPP with Undifferenced Integer Ambiguity Resolution, Experimental Results." Proceedings of the ION GNSS [online] Sep. 21-24, 2010 [retrieved on Aug. 31, 2016]. Retrieved from the Internet <URL:http://www.ppp-wizard.net/Articles/laurichesse_ion_gnss_2010_bdp.pdf> (11 pages).

Blewitt, Geoffrey. "Carrier Phase Ambiguity Resolution for the Global Positioning System Applied to Geodetic Baselines up to 2000 km." Journal of Geophysical Research [online], vol. 94, No. B8, pp. 10187-10203, Aug. 10, 1989 [retrieved on Aug. 31, 2016]. Retrieved from the Internet: <URL:http://www.colorado.edu/ASEN/asen6090/blewitt.pdf#page=1&zoom=auto,-154,811> (17 pages).

Banville, Simon. "Ambiguity Resolution." BlackDot GNSS [online], Apr. 25, 2015 [retrieved on Sep. 6, 2016]. Retrieved from the Internet <URL:http://www.blackdotgnss.com/2015/04/25/ambiguity-resolution/> (3 pages).

Teunissen, P.J.G. "Towards a Unified Theory of GNSS Ambiguity Resolution." Journal of Global Positioning Systems [online], vol. 2,

(56) References Cited

OTHER PUBLICATIONS

No. 1, pp. 1-12, 2003 [retrieved on Sep. 6, 2016]. Retrieved from the Internet <URL:http://citeseerx.ist.psu.edu/viewdoc/download?doi=10.1.1.454.4430&rep=rep1&type=pdf> (12 pages).

Teunissen, P.J.G. “Least-Squares Estimation of the Integer GPS Ambiguities.” International Association of Geodesy General Meeting, Section IV: Theory and methodology, Beijing, China, 1993 [online] retrieved on Sep. 6, 2016]. Retrieved from the Internet: <URL:http://citeseerx.ist.psu.edu/viewdoc/download?doi=10.1.1.475.9393&rep=rep1&type=pdf> (16 pages).

“Hemisphere GNSS Debuts Atlas GNSS Correction Service.” GPS World Staff. GPS World [online], Jun. 15, 2015 [retrieved on Sep. 6, 2016]. Retrieved from the Internet: <URL:http://gpsworld.com/hemisphere-gnss-debuts-atlas-gnss-correction-service/> (12 pages).

Teunissen, P.J.G. “GNSS Ambiguity Bootstrapping: Theory and Application.” Proceedings of International Symposium on Kinematic Systems in Geodesy, Geomatics and Navigation [online], pp. 246-254, Jun. 2001 [retrieved on Nov. 16, 2016]. Retrieved from the Internet <URL:http://www.ucalgary.ca/engo_webdocs/SpecialPublications/KIS%2001/PDF/0503.PDF> (9 pages).

Teunissen, P.J.G. “Theory of Integer Equivariant Estimation with Application to GNSS.” Journal of Geodesy [online], vol. 77, No. 7-8, pp. 402-410, 2003 [retrieved on Nov. 16, 2016]. Retrieved from the Internet <URL:http://link.springer.com/article/10.1007/s00190-003-0344-3> (9 pages).

Wen, Zhibo, et al. “Best Integer Equivariant Estimation for Precise Point Positioning.” Institute for Communications and Navigation 2012 Proceedings [online], pp. 279-282, Sep. 12-14, 2012 [retrieved on Sep. 6, 2016]. Retrieved from the Internet <URL:http://ieeexplore.ieee.org/xpls/abs_all.jsp?arnumber=6338525&tag=1> (4 pages).

Shi, J., Gao, Y. “A Fast Integer Ambiguity Resolution Method for PPP.” Proceedings of the ION GNSS [online], Nashville, TN, pp. 3728-3734, Sep. 17-21, 2012 [retrieved on Nov. 16, 2016]. Retrieved from the Internet <URL:https://www.ion.org/publications/abstract.cfm?articleID=10548> (7 pages).

Teunissen, P.J.G. “The Least-squares Ambiguity Decorrelation Adjustment: A Method for Fast GPS Integer Ambiguity Estimation.” Journal of Geodesy [online], vol. 70, No. 1-2 pp. 65-82, 1995 [retrieved on Nov. 16, 2016]. Retrieved from the Internet <URL:http://link.springer.com/article/10.1007/BF00863419> (18 pages).

De Jonge, P. and Tiberius, C. “The LAMBDA Method for Integer Ambiguity Estimation: Implementation Aspects.” Publications of the Delft Computing Centre [online], LGR-Series No. 12, pp. 1-47, Aug. 1996 [retrieved on Sep. 6, 2016]. Retrieved from the Internet <URL:http://www.citg.tudelft.nl/fileadmin/Faculteit/CiTG/Over_de_faculteit/Afdelingen/Afdeling_Geoscience_and_Remote_Sensing/pubs/lgr12.pdf> (59 pages).

Chang, X. W., Yang, X. and Zhou, T. “MLAMBDA: A Modified LAMBDA Method for Integer Least-squares Estimation.” Journal of Geodesy [online], vol. 79, No. 9, pp. 552-565, Dec. 2005 [retrieved on Sep. 6, 2016]. Retrieved from the Internet <URL:http://www.cs.mcgill.ca/~chang/pub/MLAMBDA.pdf> (22 pages).

Baroni, Leandro and Kuga, Helio K. “Evaluation of Two Integer Ambiguity Resolution Methods for Real Time GPS Positioning.” WSEAS Transactions on Systems 8.3, pp. 323-333, Mar. 2009 [retrieved on Sep. 6, 2016]. Retrieved from the Internet <URL:https://www.researchgate.net/profile/Helio_Kuga/publication/41146341_Evaluation_of_Two_Integer_Ambiguity_Resolution_Methods_for_Real_Time_GPS_Positioning/links/543687fe0cf2bf1f1f2bd8d1.pdf> (11 pages).

Verhagen, Sandra. “The GNSS Integer Ambiguities: Estimation and Validation.” Delft Institute of Earth Observation and Space Systems, Delft University of Technology, Jan. 31, 2005 [retrieved on Sep. 6, 2016]. Retrieved from the Internet <URL:http://repository.tudelft.nl/islandora/object/uuid:07c6f2be-3a70-42aa-97b3-894a5770454d/?collection=research> (196 pages).

Lin, P. and Zhang, X. “Precise Point Positioning With Partial Ambiguity Fixing.” Sensors [online journal], vol. 15, No. 6, pp. 13627-13643, Jun. 10, 2015 [retrieved on Sep. 6, 2016]. Retrieved from the Internet:<URL:http://www.mdpi.com/1424-8220/15/6/13627/htm> (17 pages).

Verhagen, Sandra, et al. “GNSS Ambiguity Resolution: Which Subset to Fix?” IGNSS Symposium 2011, International Global Navigation Satellite Systems Society, University of New South Wales, Sydney, Australia, Nov. 15-17, 2011 [retrieved on Sep. 6, 2016]. Retrieved from the Internet:<URL:http://repository.tudelft.nl/islandora/object/uuid:075deb5b-5253-4daf-97be-f7126519612b/?collection=research> (15 pages).

Pan, L., Cai, C., Santerre, R. and Zhu, J. “Combined GPS/GLONASS Precise Point Positioning with Fixed GPS Ambiguities.” Sensors [online journal], vol. 14, No. 9, pp. 17530-17547, Sep. 18, 2014 [retrieved on Sep. 6, 2016]. Retrieved from the Internet: <URL:http://www.mdpi.com/1424-8220/14/9/17530/htm>. <DOI:10.3390/s140917530> (18 pages).

Gratton, L., Joerger, M. and Pervan, B. “Carrier Phase Relative RAIM Algorithms and Protection Level Derivation.” Journal of Navigation [online], vol. 63, No. 2, pp. 215-231, Apr. 1, 2010 [retrieved on Sep. 6, 2016]. Retrieved from the Internet: <URL:https://www.cambridge.org/core/journals/journal-of-navigation/article/div-classtitlecarrier-phase-relative-raim-algorithms-and-protection-level-derivationdiv/AEA4489E97E3C131EBD3E2184B3F0DD7> <DOI:10.1017/S0373463309990403> (17 pages).

“Trimble XFill RTK.” Trimble Navigation Limited [online white paper], Sep. 2012 [retrieved on Sep. 6, 2016]. Retrieved from the Internet: < URL: http://trl.trimble.com/docushare/dsweb/Get/Document-630776/022543-551_Trimble%20xFill%20White%20Paper_1012_sec.pdf> (15 pages).

NovAtelCORRECT. NovAtel Inc. [online brochure], Nov. 2015 [retrieved on Sep. 6, 2016]. Retrieved from the Internet: <URL: http://www.novatel.com/assets/Documents/Papers/NovAtelCORRECT-Brochure.pdf> (8 pages).

Reußnerr, N. and Wanniger, L. “GLONASS Inter-frequency Code Biases and PPP Carrier-Phase Ambiguity Resolution.” Geodetic Institute, Technische Universität Dresden, IGS Workshop, Jul. 2012 [retrieved Aug. 31, 2016]. Retrieved from the Internet: <URL:https://tu-dresden.de/bu/umwelt/geo/gi/gg/ressourcen/dateien/veroeffentlichungen/gs2012.pdf?lang=en> (1 page).

Sleewagen, J., et al. “Digital versus Analog: Demystifying GLONASS Inter-Frequency Carrier Phase Biases.” Inside GNSS [online], May/Jun. 2012 [retrieved Aug. 31, 2016]. Retrieved from the Internet:<URL:http://www.insidegnss.com/auto/mayjune12-Sleewaegen.pdf> (5 pages).

Carcanague, S., et al. “Finding the Right Algorithm Low-Cost, Single-Frequency GPS/GLONASS RTK for Road Users.” Inside GNSS [online], vol. 8 No. 6, pp. 70-80, Nov./Dec. 2013 [retrieved Aug. 31, 2016]. Retrieved from the Internet:<URL:http://www.insidegnss.com/auto/novdec13-WP.pdf> (11 pages).

Wang, J. and Feng, Y. “Reliability of Partial Ambiguity Fixing with Multiple GNSS Constellations.” Journal of Geodesy [online], vol. 87, No. 1, pp. 1-14, Jun. 12, 2012 [retrieved Aug. 31, 2016]. Retrieved from the Internet:<URL:http://link.springer.com/article/10.1007/s00190-012-0573-4> <DOI:10.1007/s00190-012-0573-4> (15 pages).

International Searching Authority, “International Search Report and Written Opinion”, issued in connection with International Patent Application No. PCT/US17/18674, dated May 11, 2017 (17 pages).

* cited by examiner 405 410 415

$$F = \begin{pmatrix} -4 \\ -3 \\ -2 \\ -1 \\ 3 \\ 5 \end{pmatrix} \quad \hat{N}_{ZD} = \begin{pmatrix} -26.690 \\ -16.896 \\ 32.051 \\ -23.14 \\ 13.691 \\ 0.447 \end{pmatrix} \quad Q_{ZD} = \begin{pmatrix} 0.0118^2 & & & & & \\ & 0.0201^2 & & & & \\ & & 0.0322^2 & & & \\ & & & 0.0178^2 & & \\ & & & & 0.0517^2 & \\ & & & & & 0.0202^2 \end{pmatrix}$$

420 425

$$\nabla(ref) = \begin{pmatrix} -1 & 1 & & & & \\ -1 & & 1 & & & \\ -1 & & & 1 & & \\ -1 & & & & 1 & \\ -1 & & & & & 1 \end{pmatrix} \quad \nabla(adjacent) = \begin{pmatrix} 1 & -1 & & & & \\ & 1 & -1 & & & \\ & & 1 & -1 & & \\ & & & 1 & -1 & \\ & & & & 1 & -1 \end{pmatrix}$$

FIG. 4

ESTIMATION OF INTER-FREQUENCY BIAS FOR AMBIGUITY RESOLUTION IN GLOBAL NAVIGATION SATELLITE SYSTEM RECEIVERS

RELATED APPLICATION(S)

This patent claims the benefit of and priority from U.S. Provisional Application Ser. No. 62/310,301, which is entitled "ESTIMATION OF INTER-FREQUENCY BIAS FOR AMBIGUITY RESOLUTION IN GLOBAL NAVIGATION SATELLITE SYSTEM RECEIVERS," and which was filed on Mar. 18, 2016. U.S. Provisional Application Ser. No. 62/310,301 is hereby incorporated by reference in its entirety.

FIELD OF THE DISCLOSURE

This disclosure relates generally to global navigation satellite system receivers and, more particularly, to estimation of inter-frequency bias for ambiguity resolution in global navigation satellite system (GNSS) receivers.

BACKGROUND

Some global navigation satellite systems, such as the global positioning system (GPS), the GALILEO system, the BEIDOU system and the quazi-zenith satellite system (QZSS), utilize satellites that broadcast their respective signals on the same carrier frequency in a particular satellite band, but with different pseudo-random (PRN) codes. However, the Russian GLONASS system utilizes satellites that transmit their respective signals with the same PRN code, but on different frequencies within a given satellite band using frequency division multiple access (FDMA). Due to FDMA, inter-frequency bias (IFB) from the GLONASS signals exists on both the code phase and carrier phase measurements in the satellite receiver. The presence of IFB can degrade the accuracy of integer ambiguity resolution when processing the received GLONASS satellite signals to determine position estimates.

BRIEF DESCRIPTION OF THE DRAWINGS

FIG. 4 illustrates example vector and matrix quantities processed by the example navigation positioning estimator of FIGS. 2 and/or 3.

Figure 1:
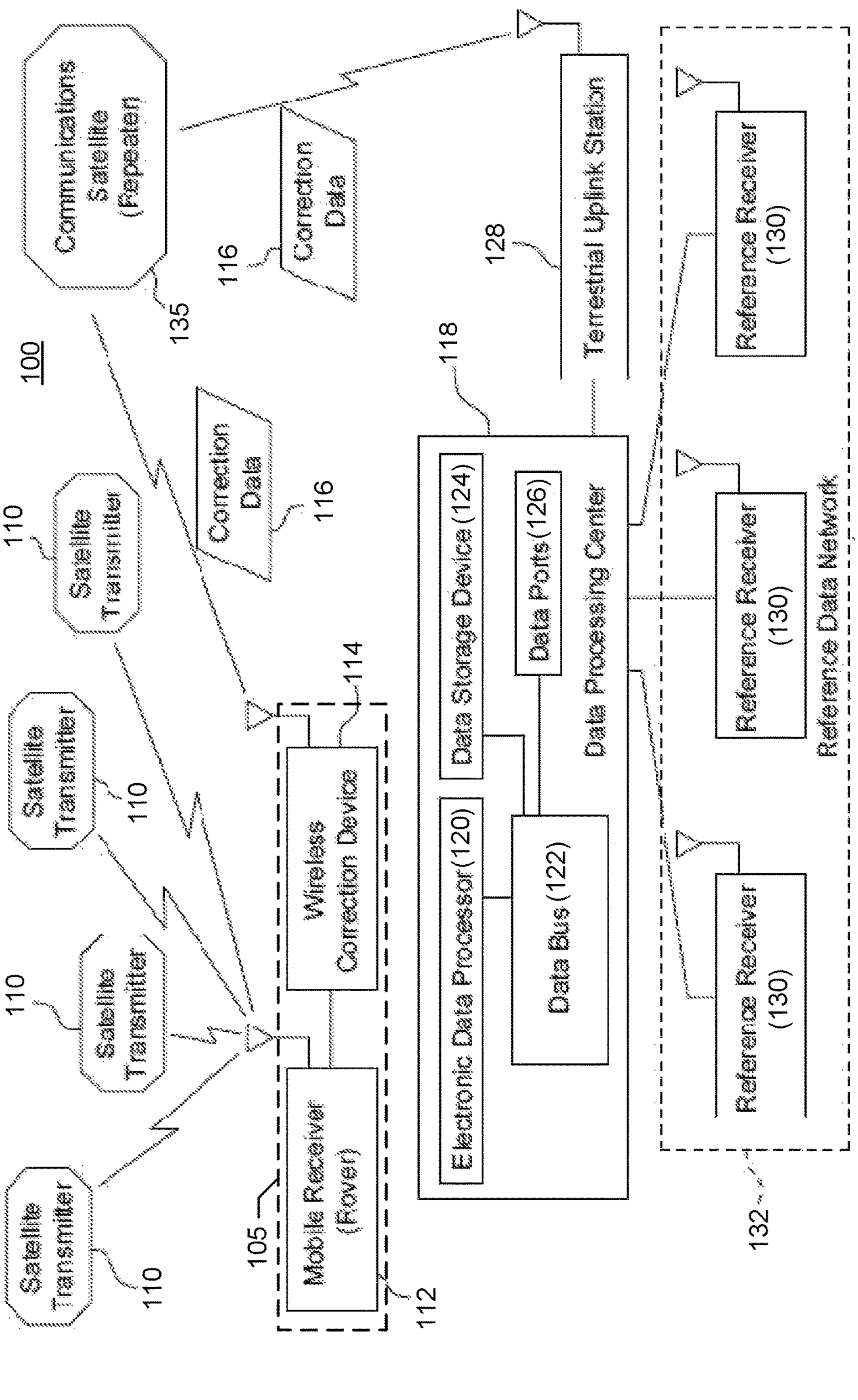
FIG. 1 is a block diagram of an example system including example mobile devices including global navigation satellite system receivers implementing estimation of inter-frequency bias for ambiguity resolution in accordance with the teachings of this disclosure.

Wherever possible, the same reference numbers will be used throughout the drawing(s) and accompanying written description to refer to the same or like parts, elements, etc. In any of the drawings of this document, any arrow or line that connects any blocks, components, modules, multiplexers, memory, data storage, accumulators, data processors, electronic components, oscillators, signal generators, or other electronic or software modules may include one or more of the following items: a physical path of electrical signals, a physical path of an electromagnetic signal, a logical path for data, one or more data buses, a circuit board trace, and/or a transmission line; a link, a call, communication, and/or data message(s) between software modules, programs, data, and/or components; transmission and/or reception of data messages, software instructions, modules, subroutines and/or components, etc.

DETAILED DESCRIPTION

Methods, apparatus, systems and articles of manufacture (e.g., physical storage media) to estimate inter-frequency bias within ambiguity resolution in global navigation satellite system receivers are disclosed herein. Example methods disclosed herein for position estimation include accessing carrier phase measurements and code measurements obtained for a plurality of satellite signals received by a receiver (e.g., a mobile receiver, a reference receiver, etc.) from a plurality of satellites of a global navigation satellite system. Disclosed example methods also include determining an initial set of floating-point ambiguities based on the carrier phase measurements and the code measurements, the initial set of floating-point ambiguities including an inter-frequency bias. In some examples, the ambiguity can refer to GLONASS wide-lane ambiguity using a Melbourne-Wübbena (MW) linear combination of both code phase and carrier phase measurements in either a reference receiver or a mobile receiver. In some examples, the ambiguity can refer to GLONASS L1 or L2 ambiguities for real-time-kinematic (RTK) applications. Disclosed example methods further include performing a least squares search process based on the initial set of floating-point ambiguities to determine a selected (e.g., best) set of integer ambiguities and a corresponding estimate of the inter-frequency bias for use in at least one of estimating a position of the receiver or determining a satellite correction signal for broadcast.

Some disclosed example methods also include accessing correction data received by the mobile receiver. In some such disclosed examples, the initial set of floating-point ambiguities corresponds to a set of single-difference floating-point ambiguities, the set of integer ambiguities corresponds to a set of single-difference integer ambiguities, and the determining of the initial set of floating-point ambiguities includes determining the set of single-difference floating-point ambiguities based on the carrier phase measurements, the code measurements and the correction data.

Additionally or alternatively, in some disclosed example methods, the performing of the least squares search process includes performing a modified least-squares ambiguity decorrelation adjustment (LAMBDA) process adapted to determine the selected set of integer ambiguities and the corresponding estimate of the inter-frequency bias to minimize a value of a quadratic formula modeling an error between the initial set of floating-point ambiguities and the selected set of integer ambiguities after removal of the corresponding estimate of the inter-frequency bias from the initial set of floating-point ambiguities. In some such disclosed examples, the value is a first value and the quadratic formula is a first quadratic formula, and the first value is based on a difference of a second value of a second quadratic formula and a third value. In some such disclosed examples, the second quadratic formula models an error between the initial set of floating-point ambiguities and the set of integer ambiguities without removal of the estimate of the inter-frequency bias from the initial set of floating-point ambiguities, and the third value models a contribution of the estimate of the inter-frequency bias to the error modeled by the second quadratic formula.

Additionally or alternatively, in some disclosed example methods, performing the modified LAMBDA search process includes determining a plurality of candidate values of the quadratic formula for a plurality of candidate sets of integer ambiguities and corresponding candidate estimates of the inter-frequency bias. Some such disclosed example methods also include selecting one of the candidate sets of integer ambiguities and a corresponding one of the candidate estimates of the inter-frequency bias associated with a lowest value of the candidate values of the quadratic formula to be the set of integer ambiguities and the estimate of the inter-frequency bias determined by the modified LAMBDA search process.

Additionally or alternatively, in some disclosed example methods, the least squares search process determines the estimate of the inter-frequency bias based on a transformed version of the initial set of floating-point ambiguities, a transformed version of the set of integer ambiguities, a gain matrix and a transformation matrix. In some such disclosed examples, the transformed version of the initial set of floating-point ambiguities corresponds to the initial set of floating-point ambiguities multiplied by the transformation matrix, and the transformed version of the set of integer ambiguities corresponds to the set of integer ambiguities multiplied by the transformation matrix.

Additionally or alternatively, some disclosed example methods also include determining a plurality of estimates of the inter-frequency bias over a time period. Some such disclosed example methods further include processing the plurality of estimates of the inter-frequency bias with a median filter to determine a filtered estimate of the inter-frequency bias for use in the at least one of the estimating of the position of the receiver or the determining of the satellite correction signal.

These and other example methods, apparatus, systems and articles of manufacture (e.g., physical storage media) to estimate inter-frequency bias for ambiguity resolution in global navigation satellite system receivers are disclosed in further detail below.

A mobile location-determining receiver or satellite receiver, such as a Global Navigation Satellite System (GNSS) receiver, is capable of estimating a position of the receiver from code phase measurements and carrier phase measurements determined from received satellite signals. However, the carrier phase measurements are subject to ambiguities, such as integer ambiguities, in the cycles of the received satellite signal. The receiver determines or resolves ambiguities of carrier phase measurements to estimate accurately the precise position or coordinates of the receiver. Although code phase or pseudo-range measurements of the GNSS receiver are not associated with integer ambiguities in the cycles of the received satellite, code phase measurements do not provide the centimeter level position accuracy desired for certain applications. As used throughout this disclosure, ambiguities are often specific to the context of particular equations which relate to observations from one or more receivers of carrier phase signals from one or more satellites. Accordingly, it is possible to have wide-lane (WL) ambiguities, narrow-lane (NL) ambiguities, zero-difference (ZD) ambiguities, single-difference (SD) ambiguities, double-difference (DD) ambiguities, real-time-kinematic (RTK) ambiguities, and refraction-corrected (RC) ambiguities that relate to carrier phase measurements from one or more receivers, or one or more satellites. Further, certain ambiguities will be specific to certain modules or predictive filters (e.g., Kalman filters) within those modules to accommodate different update rates of the filters and states of the filters, and communication of data or states between the filters of different modules. In this document, any reference to ambiguity can refer to a singular ambiguity or plural ambiguities.

If the satellite navigation receiver can receive at least two frequencies, such as the L1 and L2 satellite band frequencies (e.g., 1602 MHz for the L1 band and 1246 MHz for the L2 band), the difference of the L1 and L2 carrier phase measurements can be combined to form wide-lane (WL) measurements (e.g., with a wavelength of approximately 86.25 centimeters for GPS) and the sum of the L1 and L2 carrier phase measurements can be combined to form narrow-lane (NL) measurements (e.g., with a wavelength of approximately 10.7 centimeters). The wide-lane measurements facilitate quick and efficient resolution of wide-lane integer ambiguities, whereas the narrow-lane measurements facilitate precise and accurate resolution of narrow-lane ambiguities with minimal phase noise. The refraction-ambiguities compensate for atmospheric delay bias, such as tropospheric delay bias.

In systems supporting precise point positioning (PPP), single difference measurements (e.g., of carrier phase or code phase) are generally formed from the WL measurements with respect to one satellite, a reference receiver and the mobile receiver (e.g., such an example rover receiver included in an example rover as disclosed in further detail below). In systems supporting RTK, double difference measurements are generally formed from the WL measurements with respect to two satellites, a reference receiver and a mobile receiver (e.g., such as a rover receiver), or by subtracting two single-difference measurements. However, some double-difference measurements can be formed with two single-difference measurements from the same reference receiver at two different times and associated with a pair of satellites.

As noted above, because some GNSS systems, such as the Russian GLONASS system, utilize FDMA, the code phase and carrier phase measurements determined by the mobile receiver from the received satellite signals exhibit inter-frequency bias (IFB). IFB can degrade the accuracy of integer ambiguity resolution unless it is removed from the double-difference (DD) observations/ambiguities in RTK or the single-difference (SD) observations/ambiguities in PPP. Many researchers have indicated that GLONASS receiver IFB on carrier phase measurements is nearly linearly correlated to satellite frequency number and, therefore, can be represented by a constant IFB rate or bias with respect to the frequency number. It was also shown that the IFBs in the L1 and L2 bands are similar in unit of length as well. These characteristics can be utilized in the modeling and estimating of IFB. Based on the linear relationship between IFB and the signal frequency number, several prior techniques have been developed to estimate the IFB rate. However, some such prior techniques need an a priori, initial value of the IFB rate with certain accuracy, or need the IFB bias to be a floating-point variable, the estimation of which may involve a time consuming search process. Also, in prior IFB estimation techniques, the modeling and correction of the carrier phase IFB is generally easier to achieve than the modeling and the correction of the code phase IFB or of a combined carrier/code phase IFB. As a consequence, difficulties occur in ambiguity resolution implementations (e.g., PPP or RTK implementations) in which the Melbourne-Wübbena (MW) linear combination of both code phase and carrier phase measurement is used for resolving the wide-lane ambiguities.

Instead of searching floating-point IFB or pre-calibrating IFB for carrier phase only IFB as in prior IFB estimation techniques, example IFB estimation techniques disclosed herein can yield an optimal IFB estimate during ambiguity search for a combination of carrier and code phase IFB, or for carrier phase only IFB. As described in further detail below, disclosed example IFB estimation techniques estimate IFB for a given possible candidate set of integer wide-lane ambiguities during a disclosed search process, and revise the quadratic form used to evaluate the ambiguity candidate. The candidate set of integer wide-lane ambiguities and the corresponding IFB estimate associated with the smallest revised quadratic form is considered to be the optimal candidate (assuming, in some examples, one or more validation criteria are met). In some disclosed examples, robust IFB estimation is further realized by median filtering of the IFB estimates determined over a fixed window time. Once the IFB bias is reliably derived, GLONASS integer ambiguity resolution can be conducted for both phase-only GLONASS ambiguity resolution and MW wide-lane ambiguity resolution. Hence, disclosed example IFB estimation techniques can be applied to real-time PPP applications without any a priori IFB information.

Turning to the figures, a block diagram of an example system 100 including an example mobile device 105 with an example GNSS receiver 112 implementing IFB estimation for ambiguity resolution in accordance with the teachings of this disclosure is illustrated in FIG. 1. In the illustrated example of FIG. 1, the mobile device 105 can by implemented by any device capable of including, implementing and/or otherwise using positioning/location estimates determined by the example GNSS receiver 112. For example, the mobile device 105 can correspond to a rover, a drone, farm equipment (e.g., a tractor and/or other movable equipment), an aircraft, a mobile phone (e.g., a smartphone), a tablet computer, etc.

The example system 100 of FIG. 1 includes an example constellation of satellites 110, including at least those satellites that are within view or reception range of one or more example reference satellite receivers 130 (e.g., example reference GNSS receivers 130). In practice, reference receivers 130 (e.g., GNSS reference stations 130) are globally distributed at sites with good satellite geometry and visibility to a set of satellites. Each reference receiver 130 has a measurement module that measures observables, such as the carrier phase of one or more received satellite signals from each satellite 110. The reference receiver 130 may also measure the pseudo-range or code phase of a pseudo-random noise code that is encoded on one or more of the carrier signals. The reference receivers 130 receive and send measurements, ephemeris data, other observables and any information derived from the deliverables, to an example data processing center 118, or hubs with similar processing capability, in real time. In some examples, each reference receiver 130 transmits (e.g., via a communications link, a communications network, a wireless channel, a communications channel, communications line, a transmission line, or otherwise) a set of carrier phase measurements of received satellite signals, and associated satellite identifiers, and ephemeris data, to the example electronic data processing center 118 (e.g., also referred to as an example reference data processing hub 118).

In some examples, the data processing center 118 includes an example electronic data processor 120, an example data storage device 124, and one or more example data ports 126 that are coupled to an example data bus 122. The data processor 120, the data storage device 124 and the one or more data ports 126 may communicate with each other via the data bus 122. Software instructions and data that are stored in the data storage device 124 may be executed by the data processor 120 to implement one or more of the blocks, components or modules (e.g., electronic modules, software modules, or both) disclosed herein. The data processor 120 may include a microcontroller, a microprocessor, a programmable logic array, an application specific integrated circuit (ASIC), a digital signal processor, or another device for processing data, manipulating, accessing, retrieving, and storing data. The data storage device 124 may include volatile electronic memory, non-volatile electronic memory, an optical storage device, a magnetic storage device, and/or another device for storing digital and/or analog data on a tangible storage medium, such as an optical disk, a magnetic disk, and/or electronic memory. The data port(s) 126 may include a buffer memory, a transceiver or both for interfacing with other network elements, such as the example reference receiver(s) 130 and/or an example terrestrial satellite uplink station 128.

In some examples, the data processing center 118 and/or the data processor 120 receive(s) the phase measurements and corresponding satellite identifiers from the reference receivers 130, and reference receiver 130 identifiers (or corresponding coordinates), and processes the phase measurements to estimate a clock bias for each satellite 110, or rather each satellite signal, or a corresponding clock solution for incorporation into example correction data 116. In some examples, the data processing center 118 and/or the data processor 120 implement IFB estimation for ambiguity resolution in accordance with the teachings of this disclosure to determine IFB estimate(s), integer ambiguity solutions, etc., for inclusion in the example correction data 116. As illustrated in the example system 100 of FIG. 1, the clock solution, clock bias and/or other correction data 116 (e.g., IFB estimate(s), integer ambiguity solutions, etc.) is provided to an example terrestrial uplink station 128 or another communications link, such as one or more transmission control protocol/Internet protocol (TCP/IP) links provided by a mobile cellular and/or other wireless communication system. For example, the terrestrial uplink station 128 transmits the clock solution, clock biases and/or other correction data 116 to an example communications satellite 135 (e.g., repeater). In turn, the communications satellite 135 is adapted to make the correction data 116 available by, for example, transmitting the correction data 116 to a wireless correction device 114 included in the example mobile device 105. The wireless correction device 114 is coupled to an example mobile satellite receiver 112 (e.g., mobile GNSS receiver 112) included in the mobile device 105. The mobile satellite receiver 112 of the illustrated example also receives satellite signals from one or more of the GNSS satellites 110 and measures the carrier phase of the received satellite signals. The mobile satellite receiver 112 of the illustrated example uses these phase measurements in conjunction with the clock solutions and/or clock biases provided in the correction data 116 to estimate the precise position, attitude, or velocity of the mobile device 105. For example, the mobile satellite receiver 112 may employ a precise point positioning estimate using precise clock and orbital solutions for the received signals of the satellites.

Precise point positioning (PPP) means the use of precise satellite orbit and clock corrections provided wirelessly via correction data (e.g., the example correction data 116), rather than normal satellite broadcast information (ephemeris data) that is encoded on the received satellite signals, to determine a relative position or absolute position of a mobile satellite navigation receiver (e.g., the mobile satellite receiver 112). PPP uses correction data that is applicable to a wide geographic area or based on a network of reference satellite receiver stations (e.g., the reference receivers 130) via a correction wireless device (e.g., the wireless correction device 114). PPP may be used without one or more local reference satellite receiver stations to provide local difference corrections (e.g., real time kinematic or RTK corrections) to the mobile receiver via a correction wireless device (e.g., the wireless correction device 114).

In the illustrated example of FIG. 1, the mobile satellite receiver 112 can achieve centimeter-level accuracy positioning by using the real-time global difference correction data 116. This correction data 116 is available and valid globally through either satellite communications (e.g., via an L-Band geostationary communication satellite) and/or one or more terrestrial wireless communications systems (e.g., a cellular wireless system or a WiFi system capable of conveying the correction data 116 from the data processing center 118). In comparison to local reference station correction, global difference correction as illustrated in the example of FIG. 1 eliminates the need for local reference stations and radio communication that would otherwise be used to establish short baselines (e.g., less than 20 kilometers to 30 kilometers) between a reference receiver 130 and the mobile device 105 for precise position accuracy.

Figure 2:
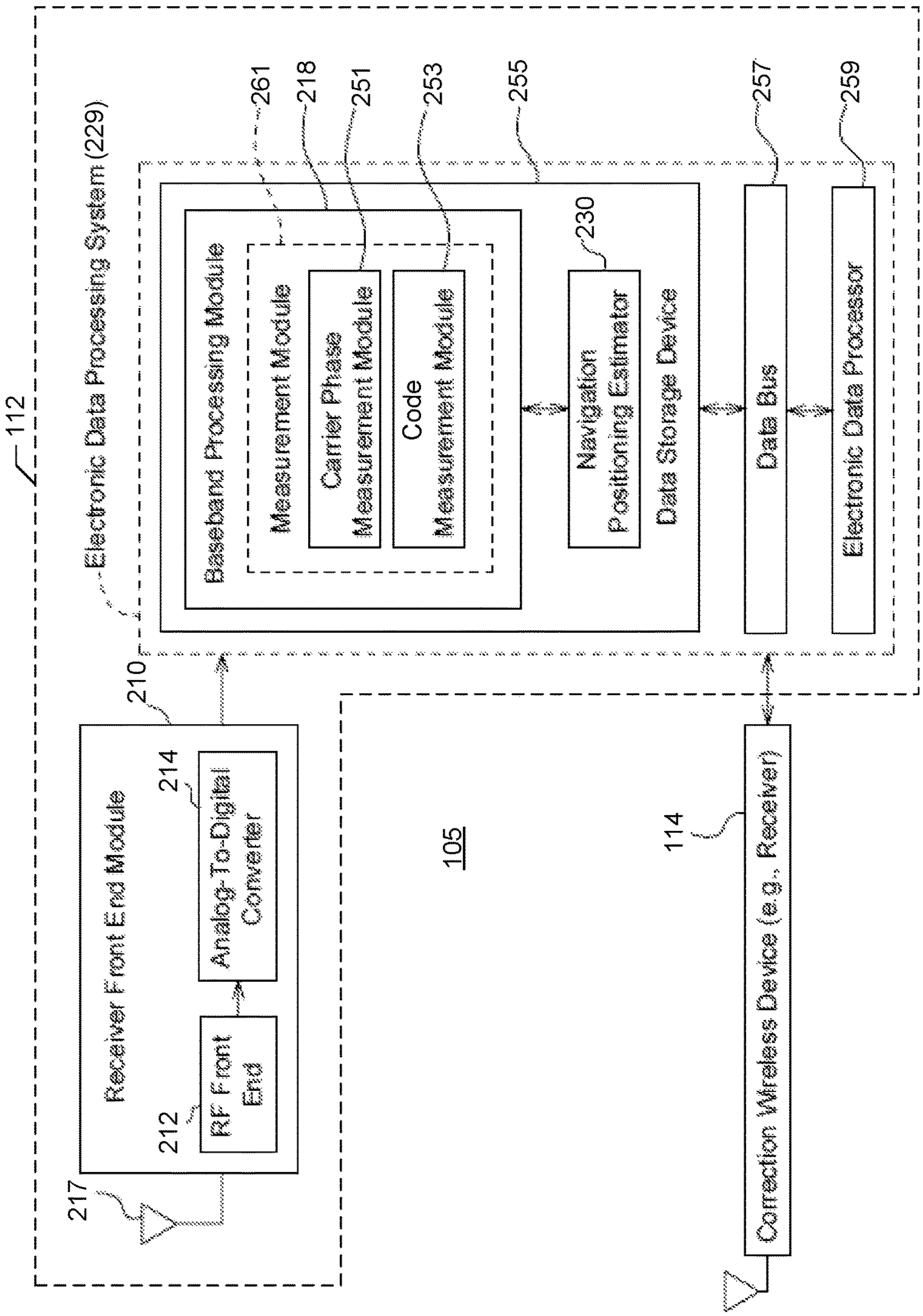
FIG. 2 is a block diagram of an example implementation of one of the example mobile devices included in the example system of FIG. 1.

A block diagram of an example implementation of the mobile device 105 of FIG. 1, which illustrates an example implementation of the mobile satellite receiver 112 capable of performing IFB estimation for ambiguity resolution in accordance with the teachings of this disclosure, is illustrated in FIG. 2. In the illustrated example of FIG. 2, the mobile satellite receiver 112 (e.g., satellite navigation receiver) is capable of reception of received signals that comprise one or more carrier signals (e.g., a first carrier (L1), a second carrier (L2), etc.) transmitted by satellites (e.g., such as the satellites 110 of FIG. 1). The received signal is transmitted from one or more satellites, such as a navigation satellite, or such as one or more Galileo-compatible navigation satellites, one or more GLONASS satellites, and/or one or more GPS satellites. The satellites have known orbital positions versus time that can be used to estimate the position between an antenna 217 of the receiver 112 and each satellite based on the propagation time of one or more received signals between four or more satellites and the antenna 217 of the receiver 112.

In some examples, the mobile satellite receiver 112 disclosed herein includes a computer-implemented system, method or receiver in which one or more data processors (e.g., such as the example electronic data processor 259) process, store, retrieve, and otherwise manipulate data via data buses (e.g., such as the example data bus 257) and one or more data storage devices (e.g., accumulators or memory, such as the example data storage device 255) as described in this document and the accompanying drawings. As used in this document, "configured to," "adapted to," or "arranged to" can mean that the data processor or receiver (e.g., the mobile satellite receiver 112) is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in FIG. 2 and/or any other drawing in this disclosure. Alternately, separately from or cumulatively with the above definition, "configured to," "adapted to," or "arranged to" can mean that the receiver (e.g., the mobile satellite receiver 112) includes one or more components described herein as software modules, equivalent electronic hardware modules, or both to execute any referenced functions, mathematical operations, calculations, determinations, processes, methods, algorithms, subroutine.

In the illustrated example of FIG. 2, the mobile satellite receiver 112 includes an example receiver front-end module 210 coupled to an example electronic data processing system 229. Further, the example correction wireless device 114 (e.g., transceiver or receiver) may provide correction data or difference correction data (e.g., PPP correction data) to enhance accuracy of the position estimates provided or estimated by the mobile satellite receiver 112.

In some example, the receiver front-end module 210 includes an example radio frequency (RF) front end 212 coupled to an example analog-to-digital converter 214. The receiver front-end module 210 or the RF front end 212 receives a set of carrier signals from one or more satellite transmitters on one or more satellites (e.g., such as the satellites 110). The analog-to-digital converter 214 converts the set of carrier signals into digital signals, such as digital baseband signals or digital intermediate frequency signals, for processing by the electronic data processing system 229.

In some examples, the electronic data processing system 229 includes an example baseband processing module 218 (e.g., a baseband/intermediate frequency processing module) and an example navigation positioning estimator 230. In the illustrated example of FIG. 2, the baseband processing module 218 and the navigation positioning estimator 230 may be implemented by computer-readable instructions stored in an example data storage device 255. However, the baseband processing module 218 and the navigation positioning estimator 230 are not limited thereto and may be implemented in other manners, such as by hardware, software, or a combination thereof, as disclosed in further detail below. As also disclosed in further detail below, the navigation positioning estimator 230 of the illustrated example implements IFB estimation in accordance with the teachings of this disclosure.

In some examples, the baseband processing module 218 includes an example carrier phase measurement module 251, an example code phase measurement module 253, or both (e.g., in an example measurement module 261). The carrier phase measurement module 251 facilitates the measurement of carrier phase of one or more carrier signals received by the mobile satellite receiver 112. The code phase measurement module 253 supports the measurement of code phase of one or more code signals that modulate the carrier signals received by the mobile satellite receiver 112.

In the illustrated example, the navigation positioning estimator 230 uses the carrier phase measurements, the code phase measurements or both to estimate the range between the mobile satellite receiver 112 and one or more satellites, or the position (e.g., three dimensional coordinates) of the mobile satellite receiver 112 with respect to one or more satellites (e.g., four or more satellites). For example, the code phase measurements and/or carrier phase measurements can be converted from propagation times, between each satellite and the mobile satellite receiver 112 that is within reception range of the receiver, to distances by dividing the propagation time by the speed of light. To determine such range/position estimates, the navigation positioning estimator 230 resolves ambiguities in the code phase measurements and/or carrier phase measurements, such as the integer ambiguity in the carrier phase of one or more received satellite signals, or a combination of carrier signals of different frequencies.

In the electronic data processing system 229 of the illustrated example, the data storage device 255 is coupled to a data bus 257. An example electronic data processor 259 may communicate with the data storage device 255 and the correction wireless device 114 via the data bus 257. The example data processor 259 may include one or more of the following: an electronic data processor, a microprocessor, a microcontroller, an application specific integrated circuit (ASIC), digital signal processor (DSP), a programmable logic device, an arithmetic logic unit, or another electronic data processing device. The data storage device 255 may include electronic memory, registers, shift registers, volatile electronic memory, a magnetic storage device, an optical storage device, or any other device for storing data.

In some examples, the navigation positioning estimator 230 includes an example precise position estimator, such as PPP estimator and/or a wide area difference GNSS position estimator, in which the navigation positioning estimator 230 receives correction data (such as the correction data 116) from the correction wireless device 114 (e.g., which includes a receiver or transceiver capable of communication with a base station or a wireless satellite communications device).

In some examples, the navigation positioning estimator 230 determines one or more of the following data: (1) an absolute position of the mobile satellite receiver 112 (or its antenna 217), (2) a reference trajectory (or reference points) of the mobile satellite receiver 112, and/or (3) bias-related parameters (e.g., then-current, bias-related parameters for storage in or retrieval from the data storage device 255) associated with previous or current precise point position estimates, where bias-related parameters relate to initial position bias of the relative position estimate, atmospheric delay bias, or receiver clock bias. The navigation positioning estimator 230 also determines IFB bias as disclosed in further detail below.

As noted above, the carrier phase measurement module 251 determines carrier phase measurements of one or more carrier signals received by the mobile satellite receiver 112, and the code phase measurement module 253 determines code phase measurements of one or more code signals that modulate the carrier signals received by the mobile satellite receiver 112. In some examples, the L1 and L2 band code phase measurements and the carrier phase measurements determined by the code phase measurement module 253 and the carrier phase measurement module 251, respectively, can be represented mathematically by Equation 1 through Equation 4, which are:

$$P_1^j = \rho^j + \tau_r + \tau^j + T + b_{P_1} + B_{P_1}^j + I^j + \varepsilon_{P_1}^j \quad \text{Equation 1}$$

$$P_2^j = \rho^j + \tau_r + \tau^j + T + b_{P_2} + B_{P_2}^j + \frac{f_1^2}{f_2^2} I^j + \varepsilon_{P_2}^j \quad \text{Equation 2}$$

$$L_1^j = \Phi_1^j \lambda_1 = \rho^j + \tau_r + \tau^j + T + b_{L_1} + B_{L_1}^j - I^j + N_1^j \lambda_1 + (W^j + w)\lambda_1 + \varepsilon_{L_1}^j \quad \text{Equation 3}$$

$$L_2^j = \Phi_2^j \lambda_2 = \rho^j + \tau_r + \tau^j + T + b_{L_2} + B_{L_2}^j - \frac{f_1^2}{f_2^2} I^j + N_2^j \lambda_2 + (W^j + w)\lambda_2 + \varepsilon_{L_2}^j \quad \text{Equation 4}$$

In Equation 1 through Equation 4, $P_i^j$ and $L_i^j$ are fundamental code phase and carrier phase measurements, respectively, for a given frequency i=(1, 2) and satellite j. In Equation 1 through Equation 4, $\rho^j$ is the geometric distance between the satellite j phase center and the receiver phase center including satellite orbital correction, receiver tide displacement and earth rotation correction. In Equation 1 through Equation 4, $\tau_r$ is the receiver r clock error for a given GNSS system. In some examples, one receiver clock bias is estimated for each GNSS system, such as a first clock bias for a GPS constellation, a second clock bias for a GLONASS constellation, a third clock bias for a Galileo constellation, and a fourth clock bias for a Beidou constellation. In some examples, one clock bias is estimated for a primary constellation, such as GPS, and relative receiver clock biases are then estimated between the primary constellation and the rest of the GNSS constellations.

In Equation 1 through Equation 4, $\tau^j$ is the satellite clock error including relativistic correction and clock correction. In Equation 1 through Equation 4, T is the tropospheric delay, and can be divided into a dry component $T_{dry}$ and a wet component $T_{wet}$. The dry component can be accurately modeled using an a priori troposphere model. The remaining wet component, after removing the a priori dry model, can be further estimated by one zenith bias with mapping function bias and/or two additional horizontal gradient coefficients. In Equation 1 through Equation 4, $b_{P_i}$ and $b_{L_i}$ are receiver dependent code phase and carrier phase bias for a given frequency i=(1, 2) and can be assumed to be same for each CDMA signal of all the visible satellites within each GNSS constellation. In Equation 1 through Equation 4, $B_{Pi}^j$ and $B_{L_i}^j$ are satellite j dependent code phase and carrier phase bias for a given frequency i=(1, 2), which change slowly over time. In Equation 1 through Equation 4, $f_i$ and $\lambda_i$ are the GNSS carrier signal frequency i and its wavelength. In Equation 1 through Equation 4, $I^j$ is the ionosphere error for a give satellite j. In Equation 1 through Equation 4, $N_i^j$ carrier phase integer ambiguity for a given frequency i and satellite j. In Equation 1 through Equation 4, $W^j$ and w are phase windup correction for both satellite j and receiver in cycles respectively, which can be corrected. In Equation 1 through Equation 4, $\varepsilon_{P_i}^j$ and $\varepsilon_{L_i}^j$ are code and phase errors including white noise, multipath and remaining model errors.

The satellite signals transmitted by GLONASS satellite are derived from the fundamental frequency (1602 MHz for L1 band, 1246 MHz for L2 band) of the satellite L-Band. Each GLONASS satellite transmits on a different frequency using an FDMA technique. The equation to give the L1 center frequency for a given satellite is given by Equation 5, which is:

$$f_1^j = 1602\text{ MHz} + n^j \times 0.5625\text{ MHz} \quad \text{Equation 5}$$

The equation to give the L2 center frequency for a given satellite is given by Equation 6, which is:

$$f_2^j=1246\text{ MHz}+n^j\times 0.4375\text{ MHz} \quad \text{Equation 6}$$

In Equation 5 and Equation 6, $n^j$ is frequency channel number (n=−7, −6, . . . , 6) of satellite j.

Figure 3:
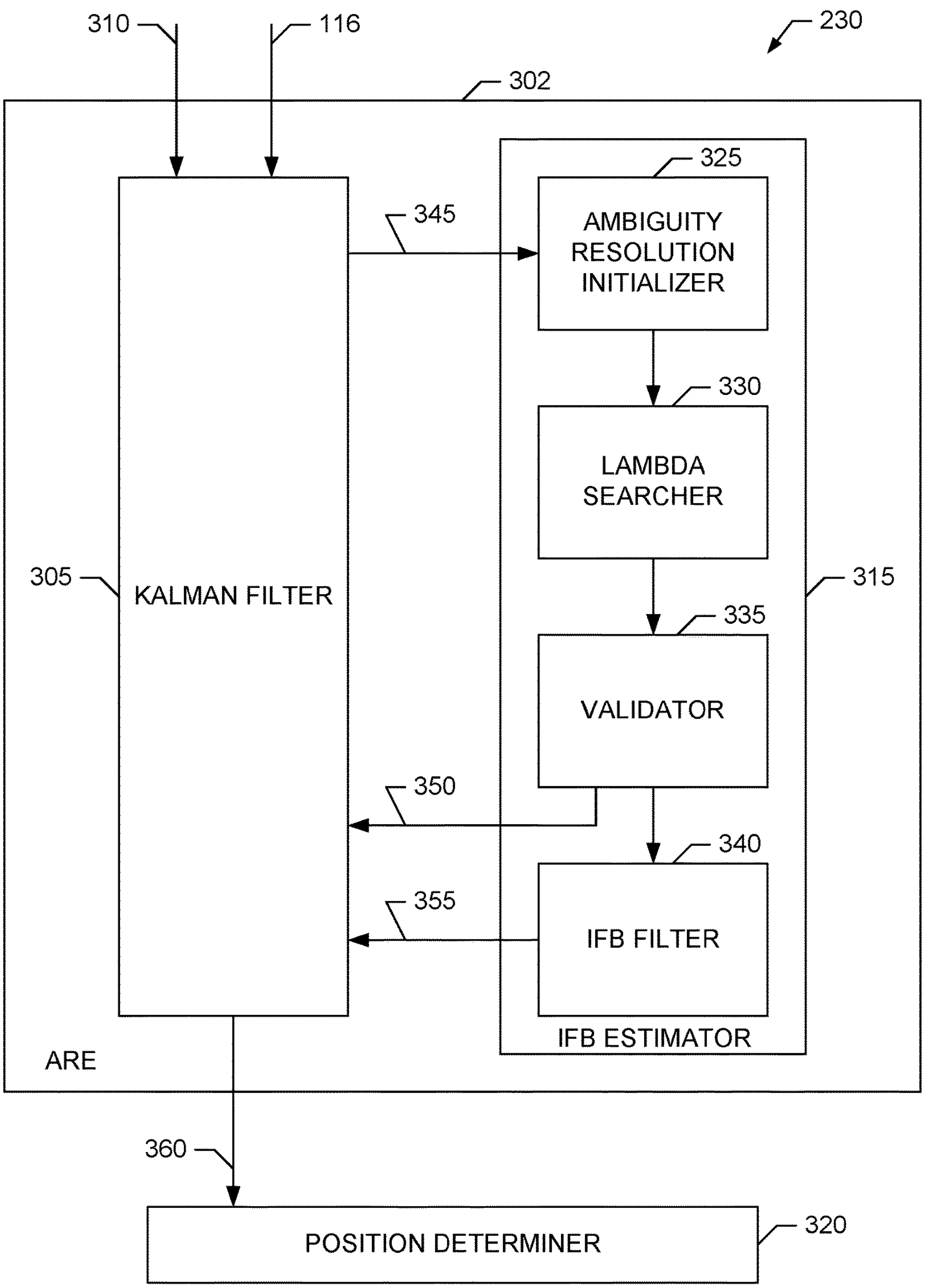
FIG. 3 is a block diagram of an example navigation positioning estimator that may be used to implement the example mobile device of FIG. 2, and which includes an example ambiguity resolution engine implemented in accordance with the teachings of this disclosure.

A block diagram of an example implementation of the navigation positioning estimator 230 of FIG. 2 is illustrated in FIG. 3. (In some examples, functionality similar to the example implementation of FIG. 3 is included in the data processing center 118 and/or the data processor 120 of FIG. 1 to permit IFB estimate(s), integer ambiguity solutions, etc., to be included in the example correction data 116 for broadcast via, for example, a satellite correction signal.) A goal of the navigation positioning estimator 230 is to determine parameters related to the integer wide-lane ambiguities $\hat{N}_{WL}^j=N_1^j-N_2^j$, which represent the differences between the carrier phase integer ambiguities $\overline{N}_i^j$, i=(1, 2), included in the code phase and carrier phase measurements of Equation 1 through Equation 4 for a given satellite j. A further goal of the navigation positioning estimator 230 is to estimate the IFB exhibited by the mobile receiver (e.g., the example mobile receiver 112) implementing or otherwise associated with the navigation positioning estimator 230, as the IFB affects the accuracy of the determined integer wide-lane ambiguities. As disclosed in further detail below, the navigation positioning estimator 230 includes an example ambiguity resolution engine (ARE) 302. The example ambiguity resolution engine 302 includes an example wide-lane Kalman filter 305 to accept example code phase measurements and the carrier phase measurements 310 (e.g., as determined by the code phase measurement module 253 and the carrier phase measurement module 251 via Equation 1 through Equation 4) and determines a first set of floating-point wide-lane ambiguities. The example ambiguity resolution engine 302 of FIG. 2 also includes an example IFB estimator 315 to perform a least squares search process to determine, based on the first set of floating-point wide-lane ambiguities, a second set of integer wide-lane ambiguities and an estimate of the IFB for use by an example position determiner 320 to estimate a position of a mobile receiver (e.g., the example mobile receiver 112) implementing or otherwise associated with the navigation positioning estimator 230.

In the illustrated example of FIG. 2, the navigation positioning estimator 230 supports precise point positioning (PPP). PPP has been developed as a method for precision navigation and positioning applications over the last decade. PPP is capable of providing decimeter positioning accuracy using a single set of clock and orbit correction data (e.g., the correction data 116 of FIG. 1) with global validity, which is generated from a sparse global network. PPP brings not only flexibility to field operations but also reduces labor and equipment cost, and simplifies operational logistics by eliminating the need for base stations and radio equipment. A growing number of real-time applications, such as precision farming, military navigation, machine control and marine offshore positioning, led to an increasing need for yet more precise and reliable navigation solution in real-time. Existing systems employing PPP are able to achieve centimeter navigation accuracy using correction data (e.g., the correction data 116) including global correction signals with additional satellite bias signals. Such systems not only improve the GNSS orbit and clock correction accuracy and reliability, but also provide additional bias correction signals to enable receivers fast pull-in to centimeter level. The observation model that has been widely used for PPP is ionosphere-free code phase and carrier phase observations to eliminate the first order of ionosphere error as shown in Equation 1 through Equation 4. The observations coming from all the satellites are processed together in a filter that solves for the different unknowns, namely the receiver coordinates, the receiver clock, the zenith tropospheric delay and the phase floating ambiguities. The accuracy of the satellite clocks and orbits are important factors affecting the quality of PPP. To achieve its full potential to applications, PPP faces challenges including a long initialization time and robust and reliable integer ambiguity resolution to derive a more precise solution. The example navigation positioning estimator 230 of FIG. 2 provides accurate and reliable integer ambiguity resolution, as well as IFB estimation/resolution.

The example wide-lane Kalman filter 305 of FIG. 3 implements a Melbourne-Wübbena (MW) wide lane filter. Accordingly, given the code phase and carrier phase measurements 310 from two frequencies, (e.g., such as Equation 1 through Equation 4 at the L1 and L2 frequencies for GPS, at the G1 and G2 frequencies for GLONASS, etc.), the Melbourne-Wübbena linear combination $\hat{N}_{WL}^j$ can be formed by the wide-lane Kalman filter 305 for a given satellite j using Equation 7, which is:

$$\hat{N}_{WL}^j=\left(\frac{f_1}{f_1+f_2}P_1^j+\frac{f_2}{f_1+f_2}P_2^j\right)-\left(\frac{f_1}{f_1-f_2}L_1^j-\frac{f_2}{f_1-f_2}L_2^j\right) \quad \text{Equation 7}$$

$\hat{N}_{WL}^j$ is also referred to as the zero difference floating point wide lane ambiguity. By expanding the above Equation 7 using Equation 1 through Equation 4, it can be shown that the geometric range related terms, including range, receiver and satellite clock, ionosphere and troposphere errors, and the phase wind-up term, are cancelled. The resulting expression for $\hat{N}_{WL}^j$ is given in Equation 8 as:

$$\hat{N}_{WL}^j=N_{WL}^j\lambda_{WL}+b_{WL}+B_{WL}^j+\varepsilon_{WL}^j \quad \text{Equation 8}$$

In Equation 8, $\lambda_{WL}$ is the wide-lane wavelength given by Equation 9 below, which is approximately 86.4 cm for GPS, where c is speed of light:

$$\lambda_{WL}=\frac{c}{f_1-f_2} \quad \text{Equation 9}$$

In Equation 8, $N_{WL}^j$ is integer wide-lane ambiguity for satellite j, which is given by Equation 10:

$$N_{WL}^j=N_1^j-N_2^j \quad \text{Equation 10}$$

In Equation 8, $b_{WL}$ is the wide-lane lane receiver bias (one per receiver and constellation for all visible satellites), which is a combination of L1 and L2 receiver code bias and phase bias, as indicated in Equation 11, which is:

$$b_{WL}=\left(\frac{f_1}{f_1+f_2}b_{P_1}+\frac{f_2}{f_1+f_2}b_{P_1}\right)-\left(\frac{f_1}{f_1-f_2}b_{L_1}-\frac{f_2}{f_1-f_2}b_{L_2}\right) \quad \text{Equation 11}$$

The majority of the GLONASS inter-frequency bias $b_{P_1}$ and $b_{P_2}$ in code measurement is assumed to be linear or sine functions with respect to the GLONASS satellite frequency number. Due to FDMA, it is not the same for all the visible satellites, in contrast with CDMA signals such as those used in GPS. The linear model for IFB for the GLONASS constellation is given by Equation 12, which is:

$$IFB^j \approx k_{IFB} \cdot n_f^j \quad \text{Equation 12}$$

In Equation 12, $k_{IFB}$ is the IFB coefficient, and $n_f^j$ is the GLONASS satellite frequency number for satellite j. The IFB varies from receiver to receiver, and also varies from one siting (antenna and cabling setup) to another siting.

In Equation 8, $B_{WL}^j$ is the wide-lane satellite j bias (one per satellite), which is a combination of L1 and L2 satellite code bias and satellite phase bias as given in Equation 13, which is:

$$B_{WL}^j = -\left(\frac{f_1}{f_1+f_2}B_{P_1}^j + \frac{f_2}{f_1+f_2}B_{P_2}^j\right) + \left(\frac{f_1}{f_1-f_2}B_{L_1}^j - \frac{f_2}{f_1-f_2}B_{L_2}^j\right) \quad \text{Equation 13}$$

The wide-lane satellite bias changes slowly over time. In Equation 8, $\varepsilon_{WL}^j$ is the wide lane error for satellite j, including white noise, multipath and remaining un-modeled error.

In some examples, the expression for zero difference floating point wide lane ambiguity $\hat{N}_{WL}^j$ in Equation 8 is simplified by dividing by the wide-lane wavelength $\lambda_{WL}$ to remove the wide-lane wavelength, rewriting the IFB term using the linear model described above and a remainder term ($B_{WL}^r$) to represent other sources of receiver bias, and lumping the wide lane error $\varepsilon_{WL}^j$ into the zero difference floating point wide lane ambiguity term. The resulting expression for the zero difference floating point wide lane ambiguity $\hat{N}_{WL}^j$ is given in Equation 14, which is:

$$\hat{N}_{WL}^j = N_{WL}^j + B_{WL}^r - B_{WL}^j + k_{IFB} * n_f^j \quad \text{Equation 14}$$

The example wide-lane Kalman filter 305 then uses zero-difference Melbourne-Wübbena linear combinations $\hat{N}_{WL}^j$ from Equation 7 as raw measurements to estimate one wide-lane ambiguity state per visible satellite. The wide-lane satellite bias $B_{WL}^j$ can be broadcast in real-time within the example correction data 116 to a receiver, and can be corrected according to Equation 8 or Equation 14. Because the receiver wide lane bias $b_{wL}$ is included in the floating point wide-lane ambiguity $\hat{N}_{WL}^j$, this zero difference wide-lane ambiguity no longer has integer characteristics. However, the single difference wide-lane ambiguity within each constellation is still integer and can be resolved in single difference form, where the receiver wide-lane bias $b_{WL}$ is cancelled. But for the GLONASS constellations, due to different frequencies being used by different satellites, the additional IFB term is also estimated by the navigation positioning estimator 230 and used by the wide-lane Kalman filter 305. The IFB varies from receiver to receiver, and also varies from one siting (antenna and cabling setup) to another siting. In some examples, the magnitude of IFB is less than 0.1 cycles per frequency number.

Given the zero difference float pint wide-lane ambiguity $\hat{N}_{WL}^j$ is the sum of a zero difference integer ambiguity and the receiver bias (IFB), the receiver bias variance can be calculated dynamically according to Equation 15, which is:

$$Q_{WL}(t) = Q_{WL}(t-1) + \begin{pmatrix} 1 & \dots & 1 \\ \vdots & \ddots & \vdots \\ 1 & \dots & 1 \end{pmatrix} q_{b_{WL}} \cdot \Delta t \quad \text{Equation 15}$$

In Equation 15, q is the process noise, which is multiplied by an all-ones matrix, and Δt is the time interval between time t−1 and t.

After a reference satellite for each constellation is chosen, the example wide-lane Kalman filter 305 then determines the single difference floating point wide-lane ambiguity and variance-covariance matrix based on the zero difference floating point ambiguity states and variance-covariance. The example IFB estimator 315 implements a modified ambiguity resolution process to estimate and resolve single difference integer wide lane ambiguities, while accounting for the potentially strong correlation between ambiguity and IFB. For example, the wide-lane Kalman filter 305 can determine the single difference floating point wide-lane ambiguity for satellite i and reference satellite j at a receiver m (e.g., the mobile receiver 112) as the difference of their zero difference ambiguities, that is, $\hat{N}_m^i - \hat{N}_m^j$. Using Equation 14, the single difference floating point wide-lane ambiguity $\hat{N}_m^i - \hat{N}_m^j$ can be represented by Equation 16, which is:

$$\hat{N}_m^i - \hat{N}_m^j = N_m^i - N_m^j - B_{WL}^i + B_{WL}^j + k_{IFB} * \nabla n_f^{ij} \quad \text{Equation 16}$$

In Equation 16, $\nabla[\ ]^{S_1S_2}$ refers to the single difference between satellite $S_1$ and $S_2$. As noted above, the correction data 116 can be used to resolve (e.g., remove) the satellite bias term ($B_{WL}^i + B_{WL}^j$) from Equation 16. Accordingly, the single difference floating point wide-lane ambiguities $\hat{N}_m^i - \hat{N}_m^j$ can be used as observations from which the single difference integer wide-lane ambiguities $\overline{N}_m^i - N_m^j$ and the IFB (or, equivalently, the IFB coefficient $k_{IFB}$) can be estimated.

In some examples, the wide-lane Kalman filter 305 additionally or alternatively determines the double difference floating point wide-lane ambiguity and variance-covariance matrix based on the zero difference floating point ambiguity states and variance-covariance from two receivers, m and n. The example IFB estimator 315 additionally or alternatively implements a modified ambiguity resolution process to estimate and resolve double difference integer wide lane ambiguities, while accounting for the potentially strong correlation between ambiguity and IFB. For example, the wide-lane Kalman filter 305 can determine the double difference floating point wide-lane ambiguity for satellite i and reference satellite j for a receiver pair m and n (e.g., the mobile receiver 112 and measurements obtained from another receiver) as the difference of their single difference ambiguities, that is, $\hat{N}_m^i - \hat{N}_m^j - \hat{N}_n^i + \hat{N}_n^j$. Using Equation 14, $\hat{N}_m^i - \hat{N}_m^j - \hat{N}_n^i + \hat{N}_n^j$ can be represented by Equation 17, which is:

$$\begin{aligned} \hat{N}_m^i - \hat{N}_m^j - \hat{N}_n^i + \hat{N}_n^j &= N_m^i - N_m^j - N_n^i + N_n^j + (k_{IFB,m} - k_{IFB,n}) * (n_f^i - n_f^j) \\ &= \nabla\Delta N_{mn}^{ij} + \Delta k_{IFB,mn} * \nabla n_f^{ij} \end{aligned} \quad \text{Equation 17}$$

In Equation 17, $\nabla[\ ]^{S_1S_2}$ refers to the single difference between satellite $S_1$ and $S_2$, $\Delta[\ ]_{r_1r_2}$ refers to the single difference between receiver $r_1$ and $r_2$, and $\nabla\Delta[\ ]_{r_1r_2}^{S_1S_2}$ refers to the double difference between receiver $r_1$ and $r_2$, and satellite $S_1$ and $S_2$ For a visible constellation of S GLONASS satellites, the example wide-lane Kalman filter 305 determines S-1 single difference ambiguity state variables, with one of the visible satellites being the reference satellite. The resulting single difference ambiguity state variables for the constellation of S satellites can be represented in matrix form according to Equation 18, which is:

$$\hat{N}_{SD}=\nabla\cdot\hat{N}_{ZD}$$

$$Q_{SD}=\nabla\cdot Q_{ZD}\cdot\nabla^T$$

$$H=\nabla\cdot F \qquad \text{Equation 18}$$

In Equation 18, $\hat{N}_{ZD}$ is a vector of zero-difference floating point wide lane ambiguities $\hat{N}_{WL}^j=\hat{N}_m^j$ determined by the receiver m for the j=1 . . . S visible satellites. In Equation 18, $\hat{N}_{SD}$ is a corresponding vector of single-difference floating point wide lane ambiguities $\hat{N}_m^i-\hat{N}_m^j$ determined, by the receiver m, for the S−1 combinations of the reference satellite j with the other visible satellites i. In Equation 18, $Q_{ZD}$ is the zero-difference variance-covariance matrix given by Equation 15. In Equation 18, $Q_{SD}$ is the corresponding single-difference variance-covariance matrix. In Equation 18, F is vector of GLONASS frequency numbers corresponding to the visible satellites, and H is a differential frequency number vector representing the differences between the frequency numbers of the reference and non-reference satellites used to compute the single difference values. In Equation 18, ∇ is a differencing matrix operator defining the differencing relationship between the zero difference ambiguities and single difference ambiguities in the equation. A matrix representation similar to Equation 18 can be used to represent the double difference ambiguity state variables for a constellation of S satellites and a collection of R receivers.

FIG. 4 illustrates example values for the vector of zero-difference floating point wide lane ambiguities $\hat{N}_{ZD}$ (corresponding to reference number 405), the zero-difference variance-covariance matrix $Q_{ZD}$ (corresponding to reference number 410) and the vector of GLONASS frequency numbers F (corresponding to reference number 415) capable of being processed by the example wide-lane Kalman filter 305. FIG. 4 also illustrates two different example differencing matrix operators ∇ that can be used by the example wide-lane Kalman filter 305 to implement Equation 18. The first example differencing matrix operators, ∇(ref) (which corresponds to reference numeral 420), can be used to form the single difference observations using the satellite having the lowest frequency number as the reference satellite. The second example differencing matrix operators, ∇(adjacent) (which corresponds to reference numeral 425), can be used to form the single difference observations by comparing pairs of satellites having adjacent frequency numbers.

Returning to FIG. 3, the example IFB estimator 315 implements an example search process to find the fixed ambiguity solution for (1) the single difference integer wide-lane ambiguities $\overline{N}_m^i-N_m^j$ and (2) the IFB coefficient $k_{IFB}$ in Equation 16 and Equation 18 by solving the integer least squares quadratic form of Equation 19, which is:

$$(\hat{N}-N_k)^T Q_{\hat{N}\hat{N}}^{-1}(\hat{N}-N_k)=\tilde{R}_k=\min \qquad \text{Equation 19}$$

In Equation 19, $\hat{N}$ is a vector of the set of single difference floating point wide-lane ambiguities $\hat{N}_m^i-\hat{N}_m^j$ determined by the wide-lane Kalman filter 305 via Equation 16 and Equation 18. In Equation 19, $N_k$ is a vector representing a candidate set of single difference integer wide-lane ambiguities $\overline{N}_m^i-N_m^j$ selected by the example IFB estimator 315 for evaluation, and $Q_{\hat{N}\hat{N}}=Q_{SD}$ is the corresponding single-difference variance-covariance matrix of Equation 18.

In some examples, the IFB estimator 315 uses Equation 19 to obtain, for each different candidate integer set $N_k$, a different value of quadratic form $\tilde{R}_k$. Thus, a single value of the quadratic form $\tilde{R}_k$ is obtained for each candidate set $N_k$ of integer ambiguities. In some examples, an optimal integer set $N_k$ that satisfies Equation 19, by producing the smallest value of $\tilde{R}_k$, and that also satisfies a discrimination test, is accepted by the example IFB estimator 315 as the correct integer ambiguity set and is used to produce the final fixed ambiguity solution. The Least-squares AMBiguity Decorrelation Adjustment (LAMBDA) search process may be used to perform such a search using transformed floating ambiguities. The LAMBDA search process is described in Teunissen, "A new method for fast carrier phase ambiguity estimation," Proc. IEEE PLANS '94, Las Vegas, Nev., 11-12 Apr. 1994, pp. 862-873, which is incorporated herein by reference. The transformed integer ambiguities are constructed from the original ambiguities, and can be used to recover the original integer ambiguities once the solution for the transformed integer ambiguities has been determined. The advantage of this procedure is that the transformed floating ambiguities have smaller standard deviations and there is a smaller number of integer candidate sets and, thus, the computation time can be reduced. The LAMBDA process involves a discrete search strategy to fix the integer ambiguities. The LAMBDA process further features two distinctive procedures for integer ambiguity estimation, which include ambiguity decorrelation, also referred to as Z-transformation, followed by a discrete search for the integer ambiguities (e.g., the integer ambiguity estimation). The LAMBDA process also involves the computation of a transformation matrix for constructing multi-satellite ambiguity combinations.

In some examples, the IFB estimator 315 of FIG. 3 implements a modified LAMBDA (MLAMBDA) search process to solve the integer least squares quadratic form of Equation 19. The MLAMBDA search process adapts a modified Z matrix reduction process and modified search process described in Chang et al., "MLAMBDA: A modified LAMBDA method for integer least-squares estimation," J. Geod. 79:552-565 (2005), which is incorporated herein by reference. The example IFB estimator 315 uses the ambiguity transformation matrix Z according to Equation 20 and Equation 21 to reformulate the original floating-point ambiguity vector $\hat{N}$ as a transformed floating-point ambiguity vector $\overline{N}$, with a transformed variance-covariance matrix $$Q_{\hat{\overline{N}}\hat{\overline{N}}}$$

having a smaller diagonal elements than the original variance-covariance matrix $Q_{\hat{N}\hat{N}}$ Equation 20 and Equation 21 are:

$$\hat{\overline{N}} = Z\cdot\hat{N} \qquad \text{Equation 20}$$

$$Q_{\hat{\overline{N}}\hat{\overline{N}}} = ZQ_{\hat{N}\hat{N}}Z^T \qquad \text{Equation 21}$$

Using Equation 20 and Equation 21, Equation 19 can be re-written as Equation 22, which is:

$$R_k = \left(\hat{\overline{N}} - \overline{N}_k\right)^T Q_{\hat{\overline{N}}\hat{\overline{N}}}^{-1}\left(\hat{\overline{N}} - \overline{N}_k\right) \qquad \text{Equation 22}$$

Thus, in some examples, the IFB estimator 315 obtains, for each different candidate, transformed integer set $\overline{N}_k$, a different value of the quadratic form $\tilde{R}_k$ of Equation 22. The original ambiguity estimation problem of Equation 19 is changed in such examples to search for an integer set $\overline{N}_k$ that minimizes the quadratic form $\tilde{R}_k$ of Equation 22 and passes validation/rejection criteria test(s). Then, for a given transformed integer set $\overline{N}_k$ that solves the quadratic form $\tilde{R}_k$ of Equation 22, the corresponding original set of single difference integer wide lane ambiguities $\overline{N}_k$ can be recovered by multiplication with the inverse of the Z transformation matrix according to Equation 23, which is:

$$N_k = Z^{-1} \cdot \overline{N}_k \quad \text{Equation 23}$$

In some examples, to ensure that the transformed ambiguity values $\overline{N}_k$ have integer characteristics, the transformation matrix Z is constrained to have integer entries. To ensure that the original ambiguity values $N_k$ can be determined from the transformed ambiguity values, the inverse of the transformation matrix also is constrained to have integer entries. Therefore, the example IFB estimator 315 determines an admissible ambiguity transformation matrix Z to be a matrix having integer entries and having a determinant that equals 1.

In the illustrated example of FIG. 3, the IFB estimator 315 further adapts the MLAMBDA search process to estimate the IFB coefficient, also referred to herein as the IFB parameter, as follows. For any integer candidate vector $\overline{N}_k$, the ambiguity error vector $\hat{N}-\overline{N}_k$ formed by subtracting the integer candidate vector $\overline{N}_k$ from the float ambiguity vector N is used by the example IFB estimator 315 as a virtual measurement vector with variance-covariance matrix $$Q_{\hat{N}\hat{N}}$$

to estimate the IFB parameter. This virtual measurement vector is related to the IFB parameter according to Equation 24 and Equation 25, which are:

$$\hat{N} - \overline{N}_k = H \cdot Y \quad \text{Equation 24}$$

$$\begin{aligned} Q_{\hat{N}-N_k\hat{N}-N_k} &= Q_{\hat{N}\hat{N}} \\ &= ZQ_{\hat{N}\hat{N}}Z^T \end{aligned} \quad \text{Equation 25}$$

In Equation 24, Y represents the IFB parameter, and H is the differential frequency number vector representing the differences between the GLONASS frequency numbers of the reference and non-reference satellites used to compute the single difference values (see Equation 18). When IFB is linear (or assumed to linear), the IFB parameter Y corresponds to the single scalar value $k_{IFB}$ of Equation 12. When IFB is non-linear (or assumed to be non-linear), the IFB parameter Y can be generalized to a vector of different IFB parameters.

The IFB parameter Y and its variance-covariance matrix $Q_{YY}$ can be derived using a least square method to yield Equation 26 through Equation 28, which are:

$$\begin{aligned} Y &= \left(H^T Q_{\hat{N}\hat{N}}^{-1} H\right)^{-1} H^T Q_{\hat{N}\hat{N}}^{-1}\left(\hat{N} - \overline{N}_k\right) \\ &= G\left(\hat{N} - \overline{N}_k\right) \end{aligned} \quad \text{Equation 26}$$

-continued $$G = \left(H^T Q_{\hat{N}\hat{N}}^{-1} H\right)^{-1} H^T Q_{\hat{N}\hat{N}}^{-1} \quad \text{Equation 27}$$

$$Q_{YY} = \left(H^T Q_{\hat{N}\hat{N}}^{-1} H\right)^{-1} \quad \text{Equation 28}$$

Thus, according to Equation 26 through Equation 28, the IFB estimator 315 of the illustrated example determines a candidate value of the IFB parameter $Y_k$ for a given candidate ambiguity error vector $\hat{N}-N_k$ by multiply the candidate ambiguity error vector $\hat{N}-N_k$ with a gain matrix G.

Because the IFB estimator 315 of the illustrated example estimates both the candidate integer wide-lane ambiguity $\overline{N}_k$ and the corresponding IFB parameter $Y_k$ for a given candidate search attempt k, the original quadratic form $\hat{R}_k$ of Equation 22 can be modified as $\tilde{R}_k$ by removing the contribution corresponding to the candidate IFB parameter $Y_k$. The modified least squares quadratic form $\tilde{R}_k$ is given by Equation 29, which is:

$$\begin{aligned} \tilde{R}_k &= \left(\hat{N} - H \cdot Y_k - \overline{N}_k\right)^T Q_{\hat{N}\hat{N}}^{-1}\left(\hat{N} - H \cdot Y_k - \overline{N}_k\right) \\ &= \left(\hat{N} - \overline{N}_k\right)^T Q_{\hat{N}\hat{N}}^{-1}\left(\hat{N} - \overline{N}_k\right) - Y_k^T Q_{YY}^{-1} Y_k \\ &= R_k - Y_k^T Q_{YY}^{-1} Y_k \end{aligned} \quad \text{Equation 29}$$

From Equation 29, it can be seen that the IFB estimator 315 of the illustrated example reduces the original quadratic form $\tilde{R}_k$ of Equation 22 by the quantity $Y_k^T Q_{YY}^{-1} Y_k$ after estimating the IFB parameter for a given candidate search attempt k. In other words, the modified least squares quadratic form $\tilde{R}_k$ of Equation 29 models an error between the set of floating point wide-lane ambiguities $\hat{N}$ and the set of integer wide-lane ambiguities $\overline{N}_k$ after removal of the estimate of the IFB $Y_k$ from the set of floating point wide-lane ambiguities $\hat{N}$. Typically, the IFB parameter is small, such as less than 0.1-0.2 cycles. Using Equation 26 through Equation 29, the example IFB estimator 315 searches through sets of candidate integer wide-lane ambiguities $\overline{N}_k$ to determine the combination of candidate integer wide-lane ambiguities $\overline{N}_k$ and corresponding IFB parameter $Y_k$ that minimizes the modified least squares quadratic form $\tilde{R}_k$ given by Equation 29. In some examples, the gain matrix G and the variance-covariance matrix $Q_{YY}$ used in Equation 26 through Equation 29 can be pre-computed by the IFB estimator 315 before performing the search process.

Based on the foregoing description, an example implementation of the IFB estimator 315, which includes an example ambiguity resolution initializer 325, an example LAMBDA searcher 330, an example validator 335 and an example IFB filter 340, is illustrated in FIG. 3. In the illustrated example of FIG. 3, the ambiguity resolution initializer 325 receives, from the example wide-lane Kalman filter 305, the set of single-difference floating point wide lane ambiguities $\hat{N}_m^i - \hat{N}_m^j = \hat{N}_{SD} = \hat{N}$ (represented by reference number 345 in FIG. 3) determined, by the receiver m, for the S-1 combinations of the reference satellite j with the other visible satellites i, as described above. The ambiguity resolution initializer 325 also receives, from the example wide-lane Kalman filter 305, the differential frequency number vector H (also represented by the reference number 345 in FIG. 3) representing the differences between the frequency numbers of the reference and non-reference satellites used to compute the single difference values. The example ambiguity resolution initializer 325 then prepare the single difference floating point wide lane ambiguity vector $\hat{N}_{SD}=\hat{N}$ from the set of single-difference floating point wide lane ambiguities, and the single-difference variance-covariance matrix $Q_{\hat{N}\hat{N}}=Q_{SD}$ according to Equation 18. The example ambiguity resolution initializer 325 further computes the integer decomposition matrix Z, the $L^T$ DL factorization $$\begin{aligned} Q_{\hat{\hat{N}}\hat{\hat{N}}} &= ZQ_{\hat{N}\hat{N}}Z^T \\ &= L^T DL \end{aligned}$$

of Equation 21, and the transformed floating point ambiguity vector $fN=\overline{\hat{N}}=Z\sim\hat{N}$ of Equation 20. The example ambiguity resolution initializer 325 also computes the gain matrix G and the variance-covariance matrix $Q_{YY}$ of Equation 27 and Equation 28. In some examples, the ambiguity resolution initializer 325 initializes a maximum value of the modified least squares quadratic form $\tilde{R}_k$ of Equation 29 to be a large number (e.g., approximating $+\infty$). In some examples, the ambiguity resolution initializer 325 initializes a maximum value of the quadratic form $Y_k^T Q_{YY}^{-1} Y_k$ of Equation 29 to correspond to the value when the IFB parameter is $Y_{Max}$=0.15 cycle (e.g., assuming the actual IFB parameter is small, such as less than 0.1-0.2 cycles).

After the initialization performed by the ambiguity resolution initializer 325, the example LAMBDA searcher 330 performs an iterative search through sets of candidate integer wide-lane ambiguities $\overline{N}_k$ to determine the combination of candidate integer wide-lane ambiguities $\overline{N}_k$ and corresponding IFB parameter $Y_k$ that minimizes the modified least squares quadratic form $\tilde{R}_k$ given by Equation 29. For example, for a given set of candidate integer wide-lane ambiguities $\overline{N}_k$, the example LAMBDA searcher 330 determines the corresponding candidate IFB parameter $Y_k$ according to Equation 26. The example LAMBDA searcher 330 then determines, according to Equation 29, the modified least squares quadratic form $\tilde{R}_k$ using the selected candidate integer wide-lane ambiguities $\overline{N}_k$, the determined candidate IFB parameter $Y_k$ and the parameters initialized by the ambiguity resolution initializer 325. The example LAMBDA searcher 330 then identifies the integer wide-lane ambiguity solution $\overline{N}$ and the determined IFB parameter solution Y to be the candidate integer wide-lane ambiguities $\overline{N}_k$ and corresponding candidate IFB parameter $Y_k$ that minimizes the modified least squares quadratic form $\tilde{R}_k$ of Equation 29.

After the LAMBDA searcher 330 identifies the candidate integer wide-lane ambiguities $\overline{N}_k$ and corresponding candidate IFB parameter $Y_k$ that minimizes the modified least squares quadratic form $\tilde{R}_k$ of Equation 29, the example validator 335 evaluates the identified integer wide-lane ambiguities $\overline{N}_k$ and corresponding IFB parameter $Y_k$ against one or more criteria to determine whether they are valid solutions. Example of validation processing performed by the example validator 335 is described in further detail below.

Assuming the example validator 335 determines the identified candidate integer wide-lane ambiguities $\overline{N}_k$ and corresponding candidate IFB parameter $Y_k$ meet the evaluated criteria, the example validator 335 determines these quantities to be the integer wide-lane ambiguity solution $\overline{N}$ and the IFB parameter solution Y, respectively. The example validator 335 then inverse transforms integer wide-lane ambiguity solution $\overline{N}$ according to Equation 23, and provides the resulting integer wide-lane ambiguity solution N (represented by the reference numeral 350 in FIG. 3) back to the wide-lane Kalman filter 305 for further processing.

In the illustrated example of FIG. 3, the IFB estimator 315 includes the example IFB filter 340 to filter the IFB parameter solutions Y determined by the LAMBDA searcher 330 and the validator 335 over time. In some examples, the IFB filter 340 implements a median filter to sort the IFB parameter solutions Y determined by the LAMBDA searcher 330 and the validator 335 over a window of time and return the median value for use by the wide-lane Kalman filter 305 (represented by the reference numeral 355 in FIG. 3). Such a median filter can be robust and yield outlier-free results when outliers correspond to fewer than half the input values over the window of time. However, in examples in which outliers are not expected, the IFB filter 340 may implement an average or weighted filter.

In some examples, the IFB filter 340 implements a median filter with a moving window size of 1 day. Assuming raw IFB parameter solutions Y are determined at a rate of one per minute per site (for PPP applications) or site-pair (for RTK applications), such a window size corresponds to 24*60=1440 raw IFB parameter samples Y. In some examples, the IFB filter 340 waits until a threshold number of raw IFB parameter samples Y, such as 720 samples corresponding to a half day of data, to output a median IFB parameter solution to augment estimation robustness.

In the illustrated example of FIG. 3, the wide-lane Kalman filter 305 provides (represented by the reference numeral 360 in FIG. 3) the resolved ambiguities, including the set of single difference floating point wide-lane ambiguities $\hat{N}$, and the solutions for the set of single difference integer wide-lane ambiguities $\overline{N}_k$, and the IFB parameter Y, to the example position determiner 320. The example position determiner 320 implements any appropriate position/location algorithm or algorithms to process the received satellite signals, the set of single difference floating point wide-lane ambiguities $\hat{N}$, the set of single difference integer wide-lane ambiguities $\overline{N}_k$, and the IFB parameter Y to estimate a position of the mobile receiver (e.g., the mobile receiver 112) implementing or otherwise associated with the example navigation positioning estimator 230.

Although the foregoing examples illustrate IFB estimation associated with floating point wide-lane ambiguities, IFB estimation for ambiguity resolution in accordance with the teachings of this disclosure is not limited thereto. On the contrary, IFB estimation for ambiguity resolution, as disclosed herein, can be performed for many other ambiguities, such as single-frequency ambiguities, L1/L2 ambiguities, etc. In such examples, the floating point wide-lane ambiguities $\hat{N}$, described above can be replaced with other ambiguity observables. The foregoing examples can then be used to estimate IFB associated with such ambiguity observables.

While an example manner of implementing the navigation positioning estimator 230 of FIG. 2 is illustrated in FIG. 3, one or more of the elements, processes and/or devices illustrated in FIG. 4 may be combined, divided, re-arranged, omitted, eliminated and/or implemented in any other way. Further, the example ambiguity resolution engine 302, the example wide-lane Kalman filter 305, the example IFB estimator 315, the example position determiner 320, the example ambiguity resolution initializer 325, the example LAMBDA searcher 330, the example validator 335, the example IFB filter 340 and/or, more generally, the example navigation positioning estimator 230 of FIG. 3 may be implemented by hardware, software, firmware and/or any combination of hardware, software and/or firmware. Thus, for example, any of the example ambiguity resolution engine 302, the example wide-lane Kalman filter 305, the example IFB estimator 315, the example position determiner 320, the example ambiguity resolution initializer 325, the example LAMBDA searcher 330, the example validator 335, the example IFB filter 340 and/or, more generally, the example navigation positioning estimator 230 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example navigation positioning estimator 230, the example ambiguity resolution engine 302, the example wide-lane Kalman filter 305, the example IFB estimator 315, the example position determiner 320, the example ambiguity resolution initializer 325, the example LAMBDA searcher 330, the example validator 335 and/or the example IFB filter 340 is/are hereby expressly defined to include a tangible computer readable storage device or storage disk such as a memory, a digital versatile disk (DVD), a compact disk (CD), a Blu-ray disk, etc. storing the software and/or firmware. Further still, the example navigation positioning estimator 230 may include one or more elements, processes and/or devices in addition to, or instead of, those illustrated in FIG. 3, and/or may include more than one of any or all of the illustrated elements, processes and devices.

Figure 5:
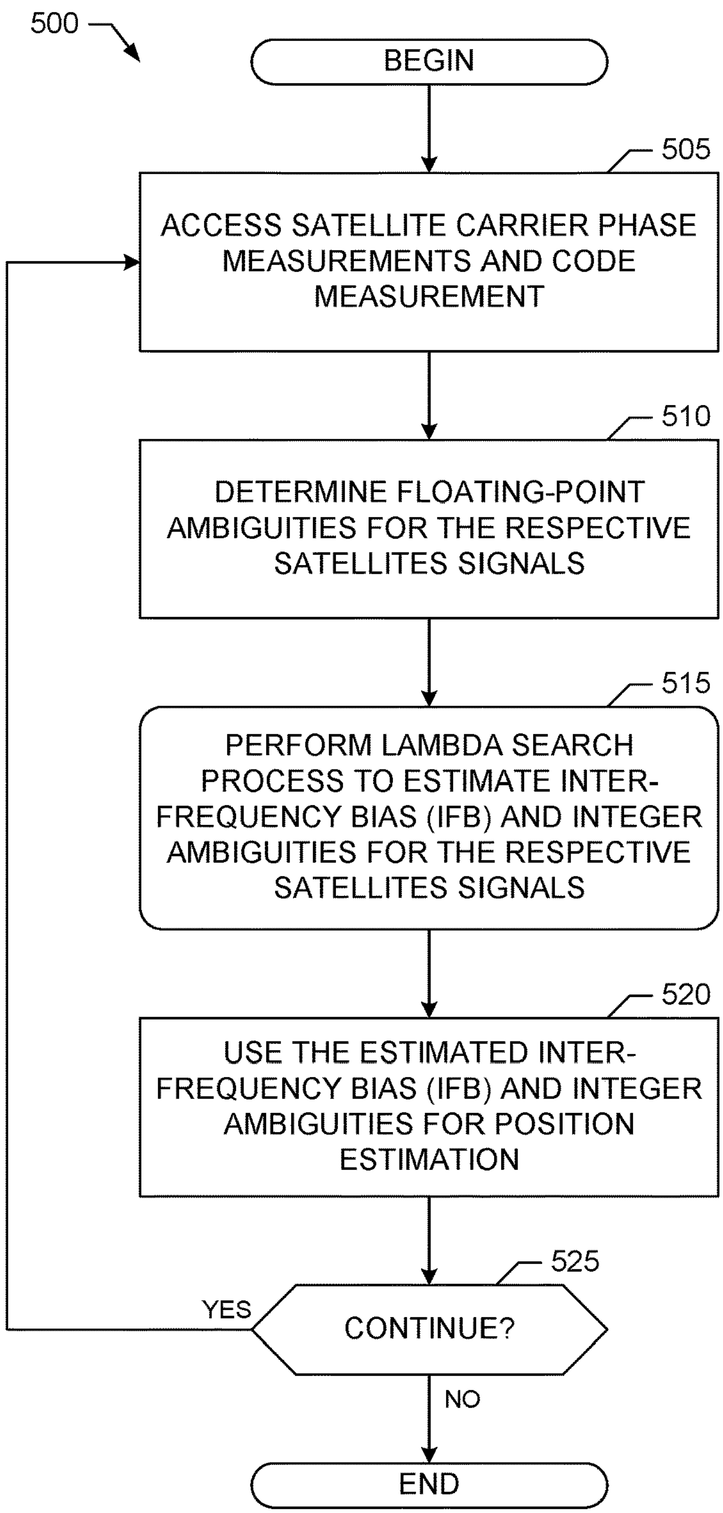
FIG. 5 is a flowchart representative of an example process that may be performed to implement the example navigation positioning estimator of FIGS. 2 and/or 3.
Figure 6:
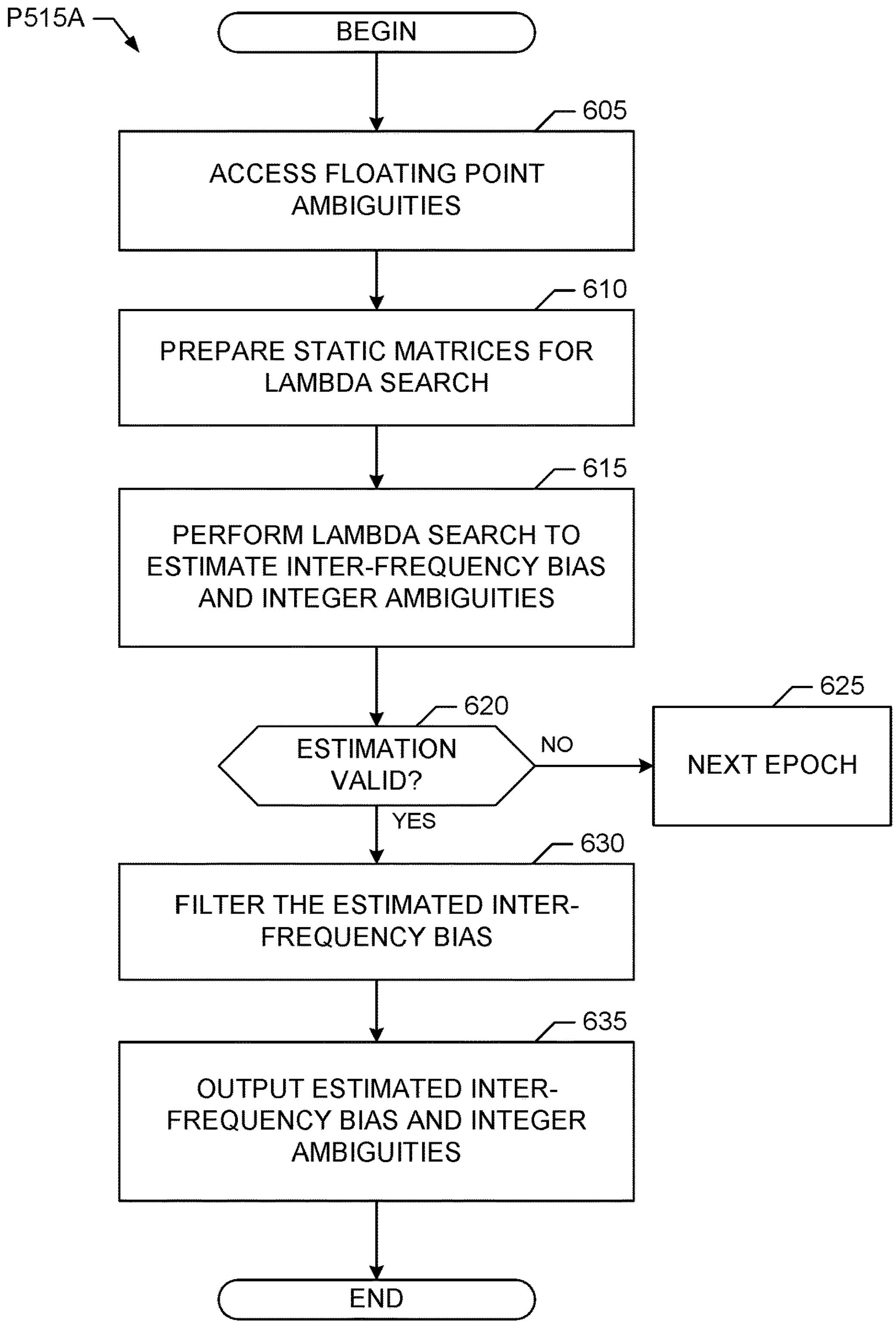
FIG. 6 is a flowchart representative of a first example process that may be performed to implement the example ambiguity resolution engine of FIG. 3.
Figure 7:
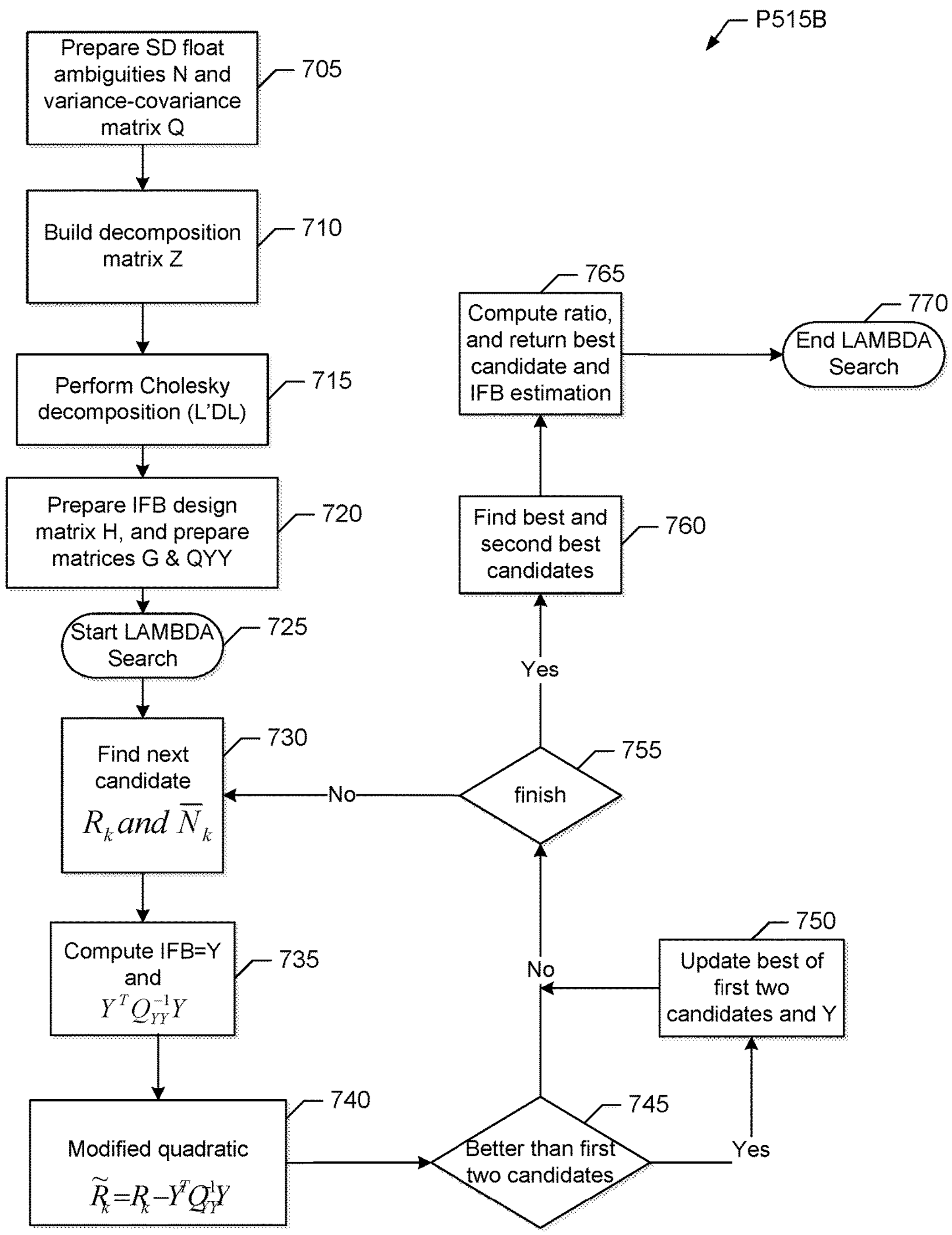
FIG. 7 is a flowchart representative of a second example process that may be performed to implement the example ambiguity resolution engine of FIG. 3.

Flowcharts representative of example machine readable instructions for implementing the example navigation positioning estimator 230, the example ambiguity resolution engine 302, the example wide-lane Kalman filter 305, the example IFB estimator 315, the example position determiner 320, the example ambiguity resolution initializer 325, the example LAMBDA searcher 330, the example validator 335 and/or the example IFB filter 340 are shown in FIGS. 5-7. In these examples, the machine readable instructions comprise one or more programs for execution by a processor, such as the processor 812 shown in the example processor platform 800 discussed below in connection with FIG. 8. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 812, but the entire program or programs and/or portions thereof could alternatively be executed by a device other than the processor 812 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 5-7, many other methods of implementing the example navigation positioning estimator 230, the example ambiguity resolution engine 302, the example wide-lane Kalman filter 305, the example IFB estimator 315, the example position determiner 320, the example ambiguity resolution initializer 325, the example LAMBDA searcher 330, the example validator 335 and/or the example IFB filter 340 may alternatively be used. For example, with reference to the flowcharts illustrated in FIGS. 5-7, the order of execution of the blocks may be changed, and/or some of the blocks described may be changed, eliminated, combined and/or subdivided into multiple blocks.

As mentioned above, the example processes of FIGS. 5-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-7 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 500 that may be executed to implement the example navigation positioning estimator 230 of FIGS. 2 and/or 3 is represented by the flowchart shown in FIG. 5. With reference to the preceding figures and associated written descriptions, the example program 500 of FIG. 5 begins execution at block 505 at which the example wide-lane Kalman filter 305 of the navigation positioning estimator 230 accesses carrier phase measurements and code measurements determined by, for example, the example carrier phase measurement module 251 and the example code phase measurement module 253 for a plurality of satellite signals received by a mobile receiver (e.g., the mobile receiver 112) from a plurality of satellites (e.g., the satellites 110) of a global navigation satellite system. At block 510, the example wide-lane Kalman filter 305 determines a first set of floating-point wide-lane ambiguities ($\hat{N}$), which include an inter-frequency bias, based on the carrier phase measurements and the code measurements accessed at block 505, as described above. At block 515, the example IFB estimator 315 of the navigation positioning estimator 230 performs a least squares search process (e.g., the LAMBDA search process described above) which uses the first set of floating-point wide-lane ambiguities ($\hat{N}$) to determine a second set of integer wide-lane ambiguities (N) and an estimate of the inter-frequency bias (Y) for use in estimating a position of the mobile receiver. At block 520, the example position determiner 320 of the navigation positioning estimator 230 estimates a position of the mobile receiver based on at least the second set of integer wide-lane ambiguities (N) and the estimate of the inter-frequency bias (Y).

At block 525, the navigation positioning estimator 230 determines whether processing is to continue. If processing is to continue (block 525), control returns to block 505 and blocks subsequent thereto at which the navigation positioning estimator 230 determines another set of integer wide-lane ambiguities (N) and inter-frequency bias estimate (Y) for another measurement interval (also referred to as a measurement epoch). Otherwise, execution of the example program 500 ends.

A first example program P515A that may be executed to implement the example IFB estimator 315 included in the example ambiguity resolution engine 302 of the navigation positioning estimator 230 of FIG. 3, and/or that may be used to perform the processing at block 515 of FIG. 5, is represented by the flowchart shown in FIG. 6. With reference to the preceding figures and associated written descriptions, the example program P515A of FIG. 6 begins execution at block 605 at which the example ambiguity resolution initializer 325 of the IFB estimator 315 accesses a first set of floating-point wide-lane ambiguities ($\hat{N}$) determines by the example wide-lane Kalman filter 305. At block 610, the ambiguity resolution initializer 325 prepares static matrices for the LAMBDA search to be performed by the example LAMBDA searcher 330 of the IFB estimator 315. For example, and as described above, the ambiguity resolution initializer 325 may prepare one or more of the single difference floating point wide lane ambiguity vector $\hat{N}_{SD}=\hat{N}$, the single-difference variance-covariance matrix $Q_{\hat{N}\hat{N}}=Q_{SD}$, the integer decomposition matrix Z, the factorization $$\begin{aligned} Q_{\hat{\bar{N}}\hat{\bar{N}}} &= ZQ_{\hat{N}\hat{N}}Z^T \\ &= L^T DL, \end{aligned}$$

the transformed floating point ambiguity vector $fN=\overline{N}=Z\cdot\hat{N}$, the design matrix H, the gain matrix G, the variance-covariance matrix $Q_{YY}$, etc., at block 610.

At block 615, the example LAMBDA searcher 330 of the IFB estimator 315 performs a LAMBDA search, as described above, to search through sets of candidate integer wide-lane ambiguities $\overline{N}_k$ to determine the combination of candidate integer wide-lane ambiguities $\overline{N}_k$ and corresponding IFB parameter $Y_k$ that minimizes the modified least squares quadratic form $\tilde{R}_k$ given by Equation 29. At block 620, the example validator 335 of the IFB estimator 315 determines whether the best combination of candidate integer wide-lane ambiguities $\overline{N}_k$ and corresponding IFB parameter $Y_k$ identified by the LAMBDA searcher 330 at block 615 as minimizing $\tilde{R}_k$ satisfies one or more criteria (e.g., validation criteria). For example, the validator 335 may determine whether the value of the modified least squares quadratic form $\tilde{R}_k$ for the best combination of candidate integer wide-lane ambiguities $\overline{N}_k$ and corresponding IFB parameter $Y_k$ is at least a threshold amount, multiple, etc., lower than the next closest value of the least squares quadratic form $\tilde{R}_k$ determined for any other combination of candidate integer wide-lane ambiguities $\overline{N}_k$ and corresponding IFB parameter $Y_k$.

If the validation criteria are not met at block 620, processing proceeds to block 625 at which the IFB estimator 315 waits for the next measurement sample interval/epoch. However, if the criteria are met at block 620, then at block 630 the example IFB filter 340 of the IFB estimator 315 filters (e.g., with a median filter) the raw solutions for the IFB parameter $Y_k$ determined at block 615 over a measurement window, as described above. Execution of the example program P515A then ends.

A second example program P515B that may be executed to implement the example IFB estimator 315 included in the example ambiguity resolution engine 302 of the navigation positioning estimator 230 of FIG. 3, and/or that may be used to perform the processing at block 515 of FIG. 5, is represented by the flowchart shown in FIG. 7. With reference to the preceding figures and associated written descriptions, the example program P515B of FIG. 7 begins execution at block 705 at which the example ambiguity resolution initializer 325 of the IFB estimator 315 prepares the single difference floating point wide lane ambiguity vector $\hat{N}_{SD}=\hat{N}$ and the single-difference variance-covariance matrix $Q_{\hat{N}\hat{N}}=Q_{SD}$, as described above. At block 710, the ambiguity resolution initializer 325 prepares the integer decomposition matrix Z, as described above. At block 715, the ambiguity resolution initializer 325 prepares the factorization $$\begin{aligned} Q_{\hat{\bar{N}}\hat{\bar{N}}} &= ZQ_{\hat{N}\hat{N}}Z^T \\ &= L^T DL, \end{aligned}$$

as described above. At block 720, the ambiguity resolution initializer 325 prepares the design matrix H, the gain matrix G and the variance-covariance matrix $Q_{YY}$, as described above.

At block 725, example LAMBDA searcher 330 of the IFB estimator 315 starts the LAMBDA search described above. For example, at block 730, the LAMBDA searcher 330 gets the next set of candidate integer wide-lane ambiguities $\overline{N}_k$ to be evaluated, and determines, as described above, the value of the original quadratic form $R_k$ of Equation 22 for that candidate (e.g., which corresponds to the first term in the modified least squares quadratic form $\tilde{R}_k$ of Equation 29). At block 735, the LAMBDA searcher 330 computes, as described above (e.g., according to Equation 26), the IFB parameter $Y_k$ corresponding to the set of candidate integer wide-lane ambiguities $\overline{N}_k$ being evaluated. At block 735, the LAMBDA searcher 330 also computes, as described above, the quantity $Y_k^T Q_{YY}^{-1} Y_k$ (e.g., which corresponds to the second term in the modified least squares quadratic form $\tilde{R}_k$ of Equation 29). At block 740, the LAMBDA searcher 330 determines the value of the modified least squares quadratic form $\tilde{R}_k$ of Equation 29 for the set of candidate integer wide-lane ambiguities $\overline{N}_k$ and corresponding IFB parameter $Y_k$ being evaluated.

At block 745, the LAMBDA searcher 330 determines whether the value of the modified least squares quadratic form $\tilde{R}_k$ for the current candidate set being evaluated is better than either of the current two best candidate sets. If so, the LAMBDA searcher 330 updates the two best candidate sets to include the current candidate set, as appropriate. At block 755, the LAMBDA searcher 330 determines whether the search is finished and all possible candidate sets have been evaluated. If the search is not finished (block 755), processing returns to block 730 and blocks subsequent thereto at which the LAMBDA searcher 330 gets the next set of candidate integer wide-lane ambiguities $\overline{N}_k$ to be evaluated. However, if the search is finished (block 755), processing proceeds to block 760.

At block 760, the example validator 335 of the IFB estimator 315 accesses the two best candidates identified by the LAMBDA searcher 330. At block 765, the example validator 335 determines the ratio of the values of the modified least squares quadratic form $\tilde{R}_k$ for the best candidate set and the second best candidate set. If the ratio satisfies a threshold, the example validator 335 indicates the search was a success and outputs the best combination of candidate integer wide-lane ambiguities $\overline{N}_k$ and corresponding IFB parameter $Y_k$ as the solution for the integer wide-lane ambiguities $\overline{N}$ and IFB parameter Y. Then, at block 770, execution of the example program P515B ends.

Figure 8:
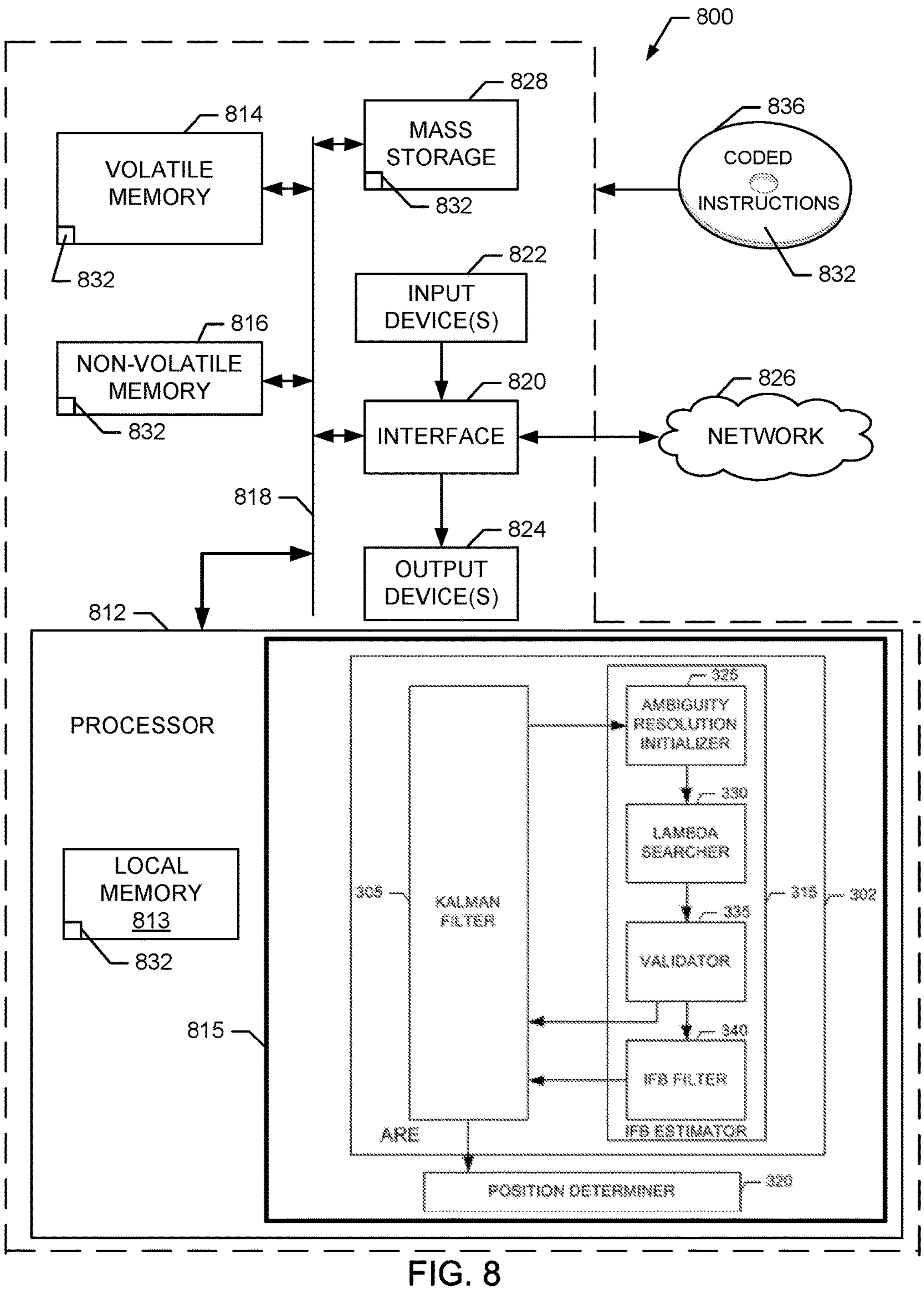
FIG. 8 is a block diagram of an example processor platform structured to execute example machine readable instructions used to implement some or all of the processes of FIGS. 5, 6 and/or 7 to implement the example navigation positioning estimator of FIGS. 2 and/or 3, and/or the example ambiguity resolution engine of FIG. 3.

FIG. 8 is a block diagram of an example processor platform 800 capable of executing the instructions of FIGS. 5, 6 and/or 7 to implement the example navigation positioning estimator 230 of FIGS. 2 and/or 3. The processor platform 800 can be, for example, any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example of FIG. 8, the processor 812 includes one or more example processing cores 815 configured via example instructions 832, which include the example instructions of FIGS. 5, 6 and/or 7, to implement example ambiguity resolution engine 302, the example wide-lane Kalman filter 305, the example IFB estimator 315, the example position determiner 320, the example ambiguity resolution initializer 325, the example LAMBDA searcher 330, the example validator 335, the example IFB filter 340 and/or, more generally, the example navigation positioning estimator 230 of FIG. 3.

The processor 812 of the illustrated example includes a local memory 813 (e.g., a cache). The processor 812 of the illustrated example is in communication with a main memory including a volatile memory 814 and a non-volatile memory 816 via a link 818. The link 818 may be implemented by a bus, one or more point-to-point connections, etc., or a combination thereof. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 800, can allow the user to control the computer system and provide data to the computer using physical gestures, such as, but not limited to, hand or body movements, facial expressions, and face recognition.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID (redundant array of independent disks) systems, and digital versatile disk (DVD) drives.

Coded instructions 832 corresponding to the instructions of FIGS. 5, 6 and/or 7 may be stored in the mass storage device 828, in the volatile memory 814, in the non-volatile memory 816, in the local memory 813 and/or on a removable tangible computer readable storage medium, such as a CD or DVD 836.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for position estimation comprising:

accessing, by executing an instruction with a processor, carrier phase measurements and code measurements obtained for a plurality of satellite signals received by a mobile receiver from a plurality of satellites of a global navigation satellite system;

determining, by executing an instruction with the processor, an initial set of floating-point ambiguities based on the carrier phase measurements and the code measurements, the initial set of floating-point ambiguities including an inter-frequency bias;

performing, by executing an instruction with the processor, a least squares search process based on the initial set of floating-point ambiguities to determine a selected set of integer ambiguities and a corresponding estimate of the inter-frequency bias; and estimating, by executing an instruction with the processor, a position of the mobile receiver based on the selected set of integer ambiguities and the corresponding estimate of the inter-frequency bias.

2. The method of claim 1, further including accessing correction data received by the mobile receiver, wherein the initial set of floating-point ambiguities corresponds to a set of single-difference floating-point ambiguities, the set of integer ambiguities corresponds to a set of single-difference integer ambiguities, and the determining of the initial set of floating-point ambiguities includes determining the set of single-difference floating-point ambiguities based on the carrier phase measurements, the code measurements and the correction data.

3. The method of claim 1, wherein the performing of the least squares search process includes performing a modified least-squares ambiguity decorrelation adjustment (LAMBDA) search process adapted to determine the selected set of integer ambiguities and the corresponding estimate of the inter-frequency bias to minimize a value of a quadratic formula modeling an error between the initial set of floating-point ambiguities and the selected set of integer ambiguities after removal of the corresponding estimate of the inter-frequency bias from the initial set of floating-point ambiguities.

4. The method of claim 3, wherein the performing of the modified LAMBDA search process includes:

determining a plurality of candidate values of the quadratic formula for a plurality of candidate sets of integer ambiguities and corresponding candidate estimates of the inter-frequency bias; and selecting one of the candidate sets of integer ambiguities and a corresponding one of the candidate estimates of the inter-frequency bias associated with a lowest value of the candidate values of the quadratic formula to be the set of integer ambiguities and the estimate of the inter-frequency bias determined by the modified LAMBDA search process.

5. The method of claim 3, wherein the value is a first value and the quadratic formula is a first quadratic formula, and the first value is based on a difference of a second value of a second quadratic formula and a third value, the second quadratic formula modeling an error between the initial set of floating-point ambiguities and the set of integer ambiguities without removal of the estimate of the inter-frequency bias from the initial set of floating-point ambiguities, and the third value modeling a contribution of the estimate of the inter-frequency bias to the error modeled by the second quadratic formula.

6. The method of claim 1, wherein the least squares search process determines the estimate of the inter-frequency bias based on a transformed version of the initial set of floating-point ambiguities, a transformed version of the set of integer ambiguities, a gain matrix and a transformation matrix, the transformed version of the initial set of floating-point ambiguities corresponding to the initial set of floating-point ambiguities multiplied by the transformation matrix, the transformed version of the set of integer ambiguities corresponding to the set of integer ambiguities multiplied by the transformation matrix.

7. The method of claim 1, further including:

determining a plurality of estimates of the inter-frequency bias over a time period; and processing the plurality of estimates of the inter-frequency bias with a median filter to determine a filtered estimate of the inter-frequency bias for use in the estimating of the position of the mobile receiver.

8. A non-transitory computer readable medium comprising computer readable instructions which, when executed, cause a processor to at least:

access carrier phase measurements and code measurements obtained for a plurality of satellite signals received by a mobile receiver from a plurality of satellites of a global navigation satellite system;

determine an initial set of floating-point ambiguities based on the carrier phase measurements and the code measurements, the initial set of floating-point ambiguities including an inter-frequency bias;

perform a least squares search process based on the initial set of floating-point ambiguities to determine a selected set of integer ambiguities and a corresponding estimate of the inter-frequency bias; and estimate a position of the mobile receiver based on the selected set of integer ambiguities and the corresponding estimate of the inter-frequency bias.

9. The non-transitory computer readable medium of claim 8, wherein the instructions, when executed, further cause the processor to access correction data received by the mobile receiver, the initial set of floating-point ambiguities corresponds to a set of single-difference floating-point ambiguities, the set of integer ambiguities corresponds to a set of single-difference integer ambiguities, and the instructions, when executed, cause the processor to determine the initial set of floating-point ambiguities by determining the set of single-difference floating-point ambiguities based on the carrier phase measurements, the code measurements and the correction data.

10. The non-transitory computer readable medium of claim 8, wherein the instructions, when executed, cause the processor to perform the least squares search process by performing a modified least-squares ambiguity decorrelation adjustment (LAMBDA) process adapted to determine the selected set of integer ambiguities and the corresponding estimate of the inter-frequency bias to minimize a value of a quadratic formula modeling an error between the initial set of floating-point ambiguities and the selected set of integer ambiguities after removal of the corresponding estimate of the inter-frequency bias from the initial set of floating-point ambiguities.

11. The non-transitory computer readable medium of claim 10, wherein the instructions, when executed, cause the processor to perform the modified LAMBDA search process by:

determining a plurality of candidate values of the quadratic formula for a plurality of candidate sets of integer ambiguities and corresponding candidate estimates of the inter-frequency bias; and selecting one of the candidate sets of integer ambiguities and a corresponding one of the candidate estimates of the inter-frequency bias associated with a lowest value of the candidate values of the quadratic formula to be the set of integer ambiguities and the estimate of the inter-frequency bias determined by the modified LAMBDA search process.

12. The non-transitory computer readable medium of claim 10, wherein the value is a first value and the quadratic formula is a first quadratic formula, and the first value is based on a difference of a second value of a second quadratic formula and a third value, the second quadratic formula modeling an error between the initial set of floating-point ambiguities and the set of integer ambiguities without removal of the estimate of the inter-frequency bias from the initial set of floating-point ambiguities, and the third value modeling a contribution of the estimate of the inter-frequency bias to the error modeled by the second quadratic formula.

13. The non-transitory computer readable medium of claim 8, wherein the least squares search process executed by the processor is to determine the estimate of the inter-frequency bias based on a transformed version of the initial set of floating-point ambiguities, a transformed version of the set of integer ambiguities, a gain matrix and a transformation matrix, the transformed version of the initial set of floating-point ambiguities corresponding to the initial set of floating-point ambiguities multiplied by the transformation matrix, the transformed version of the set of integer ambiguities corresponding to the set of integer ambiguities multiplied by the transformation matrix.

14. The non-transitory computer readable medium of claim 8, wherein the instructions, when executed, further cause the processor to:

determine a plurality of estimates of the inter-frequency bias over a time period; and process the plurality of estimates of the inter-frequency bias with a median filter to determine a filtered estimate of the inter-frequency bias for use in the estimation of the position of the mobile receiver.

15. An apparatus comprising:

an ambiguity resolution engine implemented at least one of on at least one processor or by hardware, the ambiguity resolution engine to:

determine an initial set of floating-point ambiguities based on carrier phase measurements and code measurements obtained for a plurality of satellite signals received by a mobile receiver from a plurality of satellites of a global navigation satellite system, the initial set of floating-point ambiguities including an inter-frequency bias; and perform a least squares search process based on the initial set of floating-point ambiguities to determine a selected set of integer ambiguities and a corresponding estimate of the inter-frequency bias; and a position determiner implemented at least one of on at least one processor or by hardware, the position determiner to estimate a position of the mobile receiver based on the selected set of integer ambiguities and the corresponding estimate of the inter-frequency bias.

16. The apparatus of claim 15, wherein the ambiguity resolution engine is further to access correction data received by the mobile receiver, wherein the initial set of floating-point ambiguities corresponds to a set of single-difference floating-point ambiguities, the set of integer ambiguities corresponds to a set of single-difference integer ambiguities, and the ambiguity resolution engine is to determine the initial set of floating-point ambiguities by determining the set of single-difference floating-point ambiguities based on the carrier phase measurements, the code measurements and the correction data.

17. The apparatus of claim 15, wherein the ambiguity resolution engine is to perform the least squares search process by performing a modified least-squares ambiguity decorrelation adjustment (LAMBDA) process adapted to determine the selected set of integer ambiguities and the corresponding estimate of the inter-frequency bias to minimize a value of a quadratic formula modeling an error between the initial set of floating-point ambiguities and the selected set of integer ambiguities after removal of the corresponding estimate of the inter-frequency bias from the initial set of floating-point ambiguities.

18. The apparatus of claim 17, wherein the value is a first value and the quadratic formula is a first quadratic formula, and the first value is based on a difference of a second value of a second quadratic formula and a third value, the second quadratic formula modeling an error between the initial set of floating-point ambiguities and the set of integer ambiguities without removal of the estimate of the inter-frequency bias from the initial set of floating-point ambiguities, and the third value modeling a contribution of the estimate of the inter-frequency bias to the error modeled by the second quadratic formula.

19. The apparatus of claim 15, wherein the least squares search process performed by the ambiguity resolution engine is to determine the estimate of the inter-frequency bias based on a transformed version of the initial set of floating-point ambiguities, a transformed version of the set of integer ambiguities, a gain matrix and a transformation matrix, the transformed version of the initial set of floating-point ambiguities corresponding to the initial set of floating-point ambiguities multiplied by the transformation matrix, the transformed version of the set of integer ambiguities corresponding to the set of integer ambiguities multiplied by the transformation matrix.

20. The apparatus of claim 15, wherein the ambiguity resolution engine is further to:

determine a plurality of estimates of the inter-frequency bias over a time period; and process the plurality of estimates of the inter-frequency bias with a median filter to determine a filtered estimate of the inter-frequency bias for use in the estimation of the position of the mobile receiver.

* * * * *